US012636574B2

(12) United States Patent
Platt et al.

(10) Patent No.: US 12,636,574 B2
(45) Date of Patent: May 26, 2026

(54) SPRING-ASSISTED DIGIT MOUNTED DEVICE FOR LAUNCHING PROJECTILES

(71) Applicant: SHR Holdings LLC, Reno, NV (US)

(72) Inventors: Ken Platt, Salt Lake City, UT (US);
Scott Robinson, Reno, NV (US)

(73) Assignee: SHR Holdings LLC, Reno, NV (US)

( * ) Notice: Subject to any disclaimer, the term of this patent is extended or adjusted under 35 U.S.C. 154(b) by 31 days.

(21) Appl. No.: 18/224,494

(22) Filed: Jul. 20, 2023

(65) Prior Publication Data

US 2024/0165498 A1     May 23, 2024

Related U.S. Application Data

(60) Division of application No. 17/088,470, filed on Nov. 3, 2020, now Pat. No. 11,738,257, which is a
(Continued)

(51) Int. Cl.
*A63F 9/02*          (2006.01)
*A01K 15/02*        (2006.01)
(Continued)

(52) U.S. Cl.
CPC .......... *A63F 9/0252* (2013.01); *A01K 15/025* (2013.01); *A63H 33/18* (2013.01); *F41B 15/00* (2013.01)

(58) Field of Classification Search
CPC ............. A63F 9/0252; A63F 2250/491; A01K 15/025; A63H 33/18; F41B 15/00; F41B 3/04
See application file for complete search history.

(56) References Cited

U.S. PATENT DOCUMENTS 1,279,712 A      9/1918  Knudsen
1,606,911 A  *  11/1926  Winbigler ............. A63F 7/0628
                                                              473/44
(Continued)

FOREIGN PATENT DOCUMENTS

EP            0639999        3/1995
EP            2450089        5/2012
(Continued)

*Primary Examiner* — Jeffrey S Vanderveen
(74) *Attorney, Agent, or Firm* — Clayton Howarth, P.C.

(57) ABSTRACT

A digit-mounted, spring-assisted device for launching a projectile in response to a launching motion of a finger by a user. The digit-mounted device may comprise a securing means for securing a launcher to the digit of the user. The securing means may comprise a strap, loop, or cinch. The digit-mounted device may further comprise a launch guide extending outwardly from a base member. A projectile may be mounted onto or into the launch guide. A spring may be mounted on the digit-mounted device which is placed under tension when the user prepares to make a launching motion with the digit. The projectile is launched in response to the user making a launching motion with the digit, using the thumb as a tensioning means. The spring is released from tension upon making a launching motion with the digit, adding to the force given to the projectile upon launch. The projectile may take a wide variety of forms.

40 Claims, 19 Drawing Sheets

Related U.S. Application Data continuation-in-part of application No. 16/518,858, filed on Jul. 22, 2019, now abandoned, which is a continuation of application No. 15/486,187, filed on Apr. 12, 2017, now Pat. No. 10,357,710, which is a continuation of application No. 14/506,508, filed on Oct. 3, 2014, now abandoned.

(60) Provisional application No. 61/887,215, filed on Oct. 4, 2013.

(51) Int. Cl.
A63H 33/18 (2006.01)
F41B 15/00 (2006.01)

(56) References Cited

U.S. PATENT DOCUMENTS

| | | | | | |
|---|---|---|---|---|---|
| 1,763,205 | A * | 6/1930 | Winbigler | ............. | A63F 7/0628 |
| | | | | | 273/317.2 |
| 3,068,851 | A | 12/1962 | Geer | | |
| 4,261,135 | A | 4/1981 | Lehman | | |
| 5,240,257 | A | 8/1993 | Sassak | | |
| 5,242,164 | A | 9/1993 | Nicoll | | |
| 5,362,066 | A | 11/1994 | Sassak | | |
| 5,465,976 | A | 11/1995 | Gonzalez | | |
| 5,492,046 | A * | 2/1996 | Jimenez | ................... | G10D 3/00 |
| | | | | | 84/319 |
| 5,868,509 | A * | 2/1999 | Crutcher | ............. | B43K 23/012 |
| | | | | | 401/7 |
| 5,885,018 | A * | 3/1999 | Sato | ..................... | B43K 23/012 |
| | | | | | 401/7 |
| 5,971,642 | A * | 10/1999 | O'Mara | ............... | B43K 23/012 |
| | | | | | 401/6 |
| 6,065,480 | A * | 5/2000 | Mader | ................... | A61C 15/046 |
| | | | | | 132/325 |
| 6,247,992 | B1 | 6/2001 | Higgins, III | | |
| 6,626,598 | B2 * | 9/2003 | Schneider | ............ | B43K 23/012 |
| | | | | | 401/258 |
| 6,669,388 | B1 * | 12/2003 | Short | ................... | B43K 23/012 |
| | | | | | 401/7 |
| 7,484,328 | B1 | 2/2009 | Daugherty | | |
| 7,654,880 | B2 | 2/2010 | Schneider | | |
| 8,915,014 | B1 * | 12/2014 | Daugherty | ............. | A01M 3/02 |
| | | | | | 43/134 |
| 10,357,710 | B2 | 7/2019 | Platt et al. | | |
| 2007/0025101 | A1 | 2/2007 | Lawless | | |
| 2008/0242185 | A1 | 10/2008 | Schneider | | |
| 2013/0037012 | A1 * | 2/2013 | Gaus | ........................ | F41F 7/00 |
| | | | | | 124/4 |
| 2014/0261352 | A1 * | 9/2014 | Loetz | ................... | A63F 9/0252 |
| | | | | | 473/614 |
| 2015/0128925 | A1 | 5/2015 | Platt et al. | | |
| 2017/0216716 | A1 | 8/2017 | Platt et al. | | |
| 2020/0016480 | A1 | 1/2020 | Platt et al. | | |
| 2021/0086064 | A1 | 3/2021 | Platt et al. | | |

FOREIGN PATENT DOCUMENTS

| | | |
|---|---|---|
| WO | WO0215997 | 2/2002 |
| WO | WO2004071608 | 8/2004 |
| WO | WO2005097284 | 10/2005 |
| WO | WO2015051345 | 4/2015 |

* cited by examiner

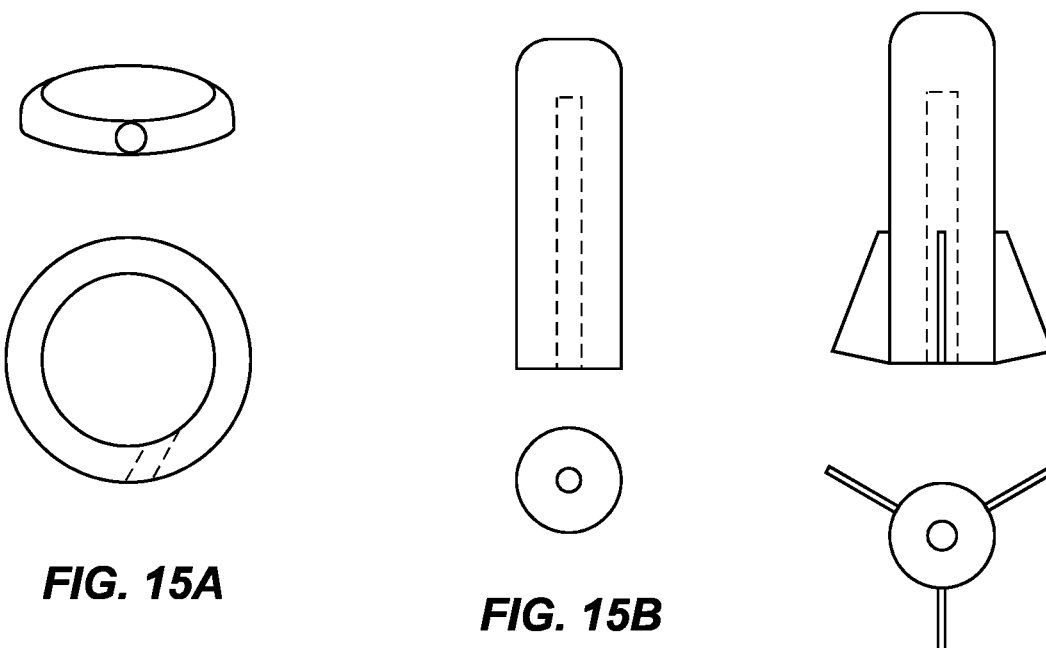
FIG. 15A
FIG. 15B
FIG. 15C
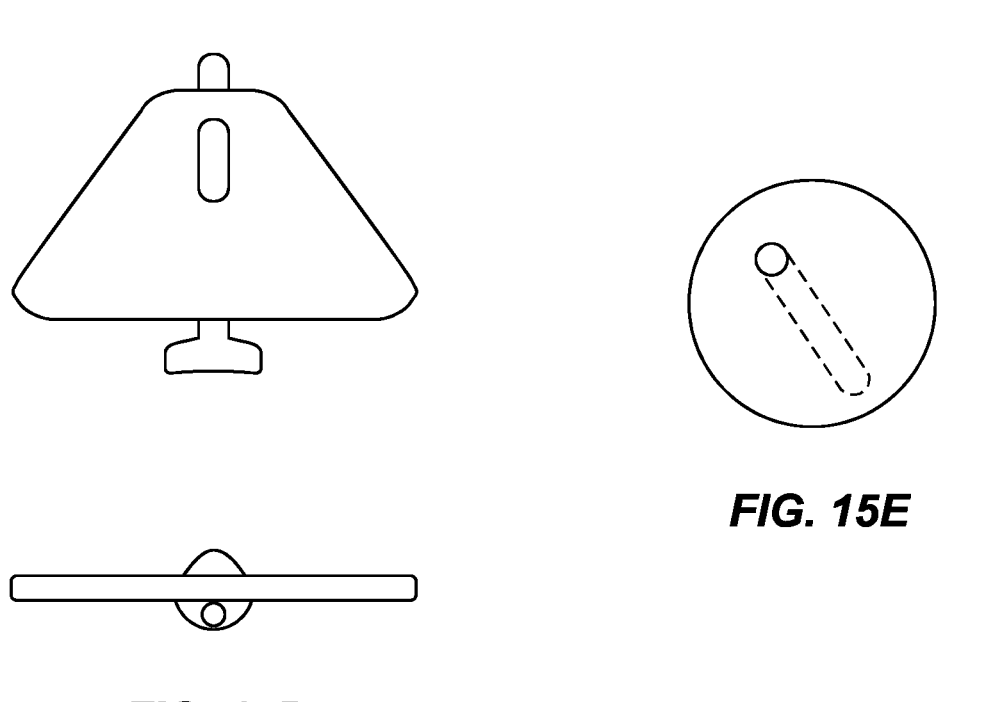
FIG. 15E
FIG. 15D

1000

1004

1014

1016

1032

1030

1016

1002

2402

2404

SPRING-ASSISTED DIGIT MOUNTED DEVICE FOR LAUNCHING PROJECTILES

CROSS-REFERENCE TO RELATED APPLICATIONS

This application is a divisional of U.S. patent application Ser. No. 17/088,470, filed Nov. 3, 2020, which is a continuation-in-part of U.S. patent application Ser. No. 16/518,858, filed Jul. 22, 2019, which is a continuation of U.S. patent application Ser. No. 15/486,187, filed Apr. 12, 2017, now U.S. Pat. No. 10,357,710, which is a continuation of U.S. patent application Ser. No. 14/506,508, filed Oct. 3, 2014, which claims the benefit of U.S. Provisional Application No. 61/887,215, filed Oct. 4, 2013, all of which are hereby incorporated by reference herein in their entireties, including but not limited to those portions that specifically appear hereinafter, the incorporation by reference being made with the following exception: In the event that any portion of the above-referenced applications are inconsistent with this application, this application supersedes said above-referenced applications.

STATEMENT REGARDING FEDERALLY SPONSORED RESEARCH OR DEVELOPMENT

Not Applicable.

BACKGROUND

1. The Field of the Present Disclosure

The present disclosure relates generally to manually operated devices for launching projectiles and more particularly, but not necessarily entirely, to digit mounted, and more specifically finger mounted, devices for launching projectiles for entertainment or other purposes.

2. Related Art

Various devices have been devised for allowing a user to launch a projectile. For example, slingshots are devices that allow a user to launch small projectiles using elastic bands or tubing. Spear-throwers, or atlatls, are tools that allow users to use leverage to achieve greater velocities when launching a spear. Other types of manually operated throwing devices are also available, including an elongated and curved ball-throwing devices. Despite these devices, improvements are still being sought for novel and unique devices for launching projectiles that can be used for entertainment, target practice, hunting, and self-protection and other purposes and functions.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which:

FIGS. 15A-15E depict various projectiles according to embodiments of the present disclosure;

DETAILED DESCRIPTION

Figure 1:
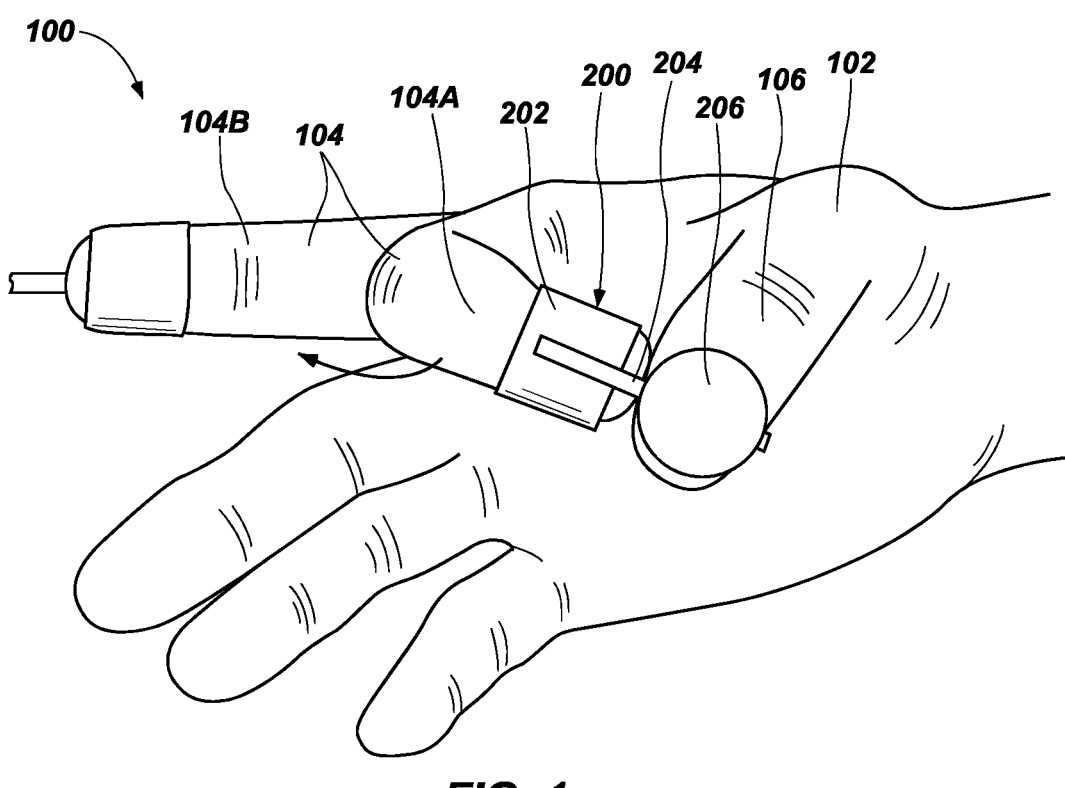
FIG. 1 is an isometric view of the present invention attached to the distal phalanx of an index finger with a single-shaft launch guide embodiment.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

In describing and claiming the present disclosure, the following terminology will be used in accordance with the definitions set out below. As used in this specification and the appended claims, the singular forms "a," "an," and "the" include plural referents unless the context clearly dictates otherwise. As used herein, the terms "comprising," "including," "having," "containing," "characterized by," and grammatical equivalents thereof are inclusive or open-ended terms that do not exclude additional, unrecited elements or method steps.

As used herein, a "flick", "fling", or "launching motion" or "rapid launching motion" constitutes digit movement where a digit, such as a finger, is curled up in the palmar direction, distal end pointing toward the proximal, then quickly moved or unfurled such that the distal end of the digit or finger extends toward the distal directional plane. Additionally, when a digit or finger is curled up in the palmar direction, distal end pointing toward the proximal, the thumb (or other digit) can be used as a tension and release mechanism when the curled up finger is tensioned against the thumb, and the thumb is moved, the curled up tensioned finger snaps quickly out toward the distal directional plane in a "flicking", "flinging", or "launching" motion. While the present disclosure utilizes a finger as an exemplary digit, it will be appreciated that other digits can be used in accordance with the principles of the present disclosure. Moreover, any structure capable of performing the herein described function of a digit is to be considered within its scope.

Figure 13:
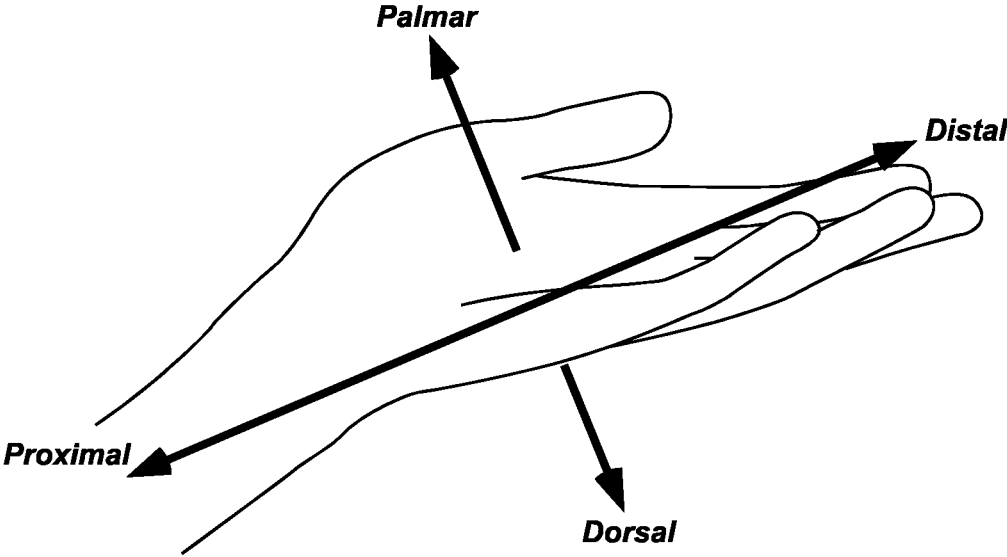
FIG. 13 is a view of a palm of a hand and fingers labeled with the directional nomenclature used herein.

As used herein, the terms "shaft" and "tube" are used herein to describe the cooperating cylindrical members or the embodiments. In the embodiments within the present disclosure, the terms may also include non-cylindrical members, such as oblong, square, or other shapes of elongated bars and bores for allowing the projectiles to be mounted on and to slide along the launcher until release to a trajectory. FIG. 13 depicts a human hand labeled with the directional terminology used herein.

Applicants have discovered a novel finger-mounted device for launching projectiles using the natural flicking or flinging motion of a finger. The device may include a launch guide to hold a projectile in place during a launching action. The launch guide may extend from an end of a finger. In an embodiment, the launch guide comprises a shaft or tube (solid or hollow) in which a bore in the projectile is slid down over the shaft to secure the projectile to the launch guide during launch preparation. Upon launch execution, a launching motion is initiated and the projectile is held in place until the centrifugal force overcomes the forces holding the projectile to the launch guide, at which point the projectile is released from the launch guide toward the distal directional plane. It will be appreciated that the forces holding the projectile onto the launch guide may include frictional and vacuum forces. Additionally, as the projectile slides off the launch guide during the launching motion, the launch guide helps to direct the trajectory of said projectile. In an embodiment, the launch guide includes different angles of the launch guide shaft in relation to the finger/fingers to which the launcher is secured. Each different angle of the launch guide shaft, in relation to the finger or fingers to which it is secured, may alter the flight properties of the projectile during launch, including but not limited to projectile velocity, point of projectile release from the launch guide and projectile trajectory.

Referring now to FIG. 1, there is shown a system 100 for launching a projectile according to an embodiment of the present disclosure. The system 100 may include a hand 102 of a user. The system 100 may further include a launch device 200 mounted on one of the fingers of the hand 102, such as the index finger 104, but other digits or fingers may be used in accordance with the present disclosure. The launch device 200 may include a securing member 202 and a launch guide 204. Loaded onto the launch guide 204 may be a projectile 206.

The securing member 202 secures the device 200 onto the tip of the finger 104. In an embodiment, the securing member 202 comprises a strap. In an embodiment, the securing member 202 comprises a strap having a hook and latch, or hook and loop, fastening means. In an embodiment, the securing member 202 may comprise one of a buckle, snap, and fastener, or other device, for securing the device 200 onto the tip of the finger 104. In an embodiment, the securing member 202 comprises a glove. In an embodiment, the securing member 202 comprises a wrist strap connected to a finger insert, similar to an archer's glove.

In an embodiment, the securing member 202 may include but is not limited to the following:

A. Strapping Mechanism

A single strap or multiple straps are used to secure the launcher to a finger and/or fingers;

Strap/straps may be part of the launcher, attached to the launcher and/or surround the launcher in order to secure the launcher to a finger and/or fingers;

Strap/straps can be fastened around finger/fingers and secured via closed loop by any number of mechanisms including but not limited to Velcro® (or Velcro-like equivalent), belt-like (belt hole, piston etc.);

Strap/straps can be fastened around finger/fingers and secured to the launcher via open slots that pinch the strap between opposing members;

Straps are fed through the open launcher slots to produce a loop;

Finger/fingers are placed inside the loop; and,

Strap ends may be pulled to tighten the loop around finger/fingers.

B. Sleeve Mechanism

One or multiple sleeves is/are slipped down over the finger/fingers to secure the launcher to the finger and/or fingers; and, Sleeve/sleeves may be part of the launcher, attached to the launcher and/or surround the launcher in order to secure the launcher to a finger and/or fingers.

C. Clip Mechanism

One or multiple clips are used to secure the launcher to a finger and/or fingers; and, Clip/clips may be part of the launcher, attached to the launcher and/or surround the launcher in order to secure the launcher to a finger and/or fingers.

D. Ring Mechanism

One ring or multiple rings is/are slipped down over the finger/fingers to secure the launcher to the finger and/or fingers; and, Ring/rings may be part of the launcher, attached to the launcher and/or surround the launcher in order to secure the launcher to a finger and/or fingers.

E. Finger Cot/Finger Sock

A finger cot/finger sock is slipped down over the distal phalanx to secure the launcher to the finger and/or fingers; and, Finger cot/finger sock may be part of the launcher, attached to the launcher and/or surround the launcher in order to secure the launcher to a finger and/or fingers.

In an embodiment, the launch guide 204 may comprise a shaft. In an embodiment, the launch guide 204 can be either removably affixed or permanently affixed to the securing member 202. In an embodiment, the launch guide 204 may comprise a shaft having a diameter smaller than a bore in a projectile. In an embodiment, the launch guide 204 may comprise a launch guide adapter that slips down over a shaft for varying the diameter of the launch guide 204 to accommodate bores of varying sizes. The launch guide adapter can be secured using a wide range of mechanisms, including a threaded mechanism, a clipping mechanism, or an adhesive mechanism.

The projectile 206 may be loaded onto the launch guide 204 by inserting a bore of the projectile 206 onto the launch guide 204. The bore may or may not extend entirely through the projectile 206. In an embodiment, the projectile 206 may have various configurations, including but not limited to:

Ball

Disc

Boomerang

Airplane/glider (with aerodynamic surfaces shaped to produce desired flight patterns)

Spaceship

Dart—Soft

Dart—Velcro

Dart—Sharp

Dart—Suction Cup

Likenesses of people (anthropomorphic), animals, fantasy creatures, and other objects real or managed Bead Bearing Throwing star (soft and hard)

6

Bird

Missile or missile-like

Paint ball

Water balloon

Whistling device

Spinning (i.e., spiral structure with wings which spins on axis)

Asymmetrically weighted (to produce non-linear motion)

Gyroscopic (containing one or more gyroscopes)

In an embodiment, as the projectile 206 may be a child toy, a teen toy, an adult toy, or a pet toy. FIGS. 15A-15E depict various embodiments of projectiles according to embodiments of the present disclosure, where the dashed lines depict an insertion slot for the launch guide 204. FIG. 15A depicts a disc-shaped projectile. FIG. 15B depicts a dart shaped projectile. FIG. 15C depicts a dart shaped projectile with fins. FIG. 15D depicts a plane shaped projectile with wings. FIG. 15E depicts a spherical or ball shaped projectile. In accordance with the present disclosure, some projectiles may weigh less than about 10 grams, less than about 100 grams or less than about 1000 grams.

As shown in FIG. 1, after the projectile 206 has been loaded onto the launch guide 204, the finger 104 may be placed in a pre-launch position indicated by the reference numeral 104A. In particular, the thumb 106 may be utilized to restrain the finger 104 in the position 104A. The user then exerts a force against the thumb 106 using the tip of the finger 104. The finger 104 is then released from the position 104A and is "flicked" to the position 104B. It will be appreciated that the flicking or flinging motion of the finger 104 causes the projectile 206 to be launched from the launch guide 204.

In an embodiment, the device 200 may be formed of:

Plastic or other polymer

Carbon fiber

Epoxy

Wood

Metal

Any other material or combination thereof known to those skilled in the pertinent art In an embodiment, the projectile 206 may be formed of:

Foam (such as a solid, spongy cellular material manufactured when a polyester resin reacts with another compound in the presence of CO2 with the gas creating open pockets within the polyurethane that make the material soft and light, such as that material available under the trademark NERF®)

In an embodiment, the device 200 may be utilized to play games, including:

Target shooting

Darts—(including with hook and loop fasteners, such as that available under the VELCRO® trademark, and suction cups, or sticky substance)

Darts—(including with a sharp penetrating tip)

Wall bounce

Bocce

Paint ball

Water balloon fight

Catch

Distance Shooting

Projectile Golf

In an embodiment, the launch guide 204 may comprise:

Rod/shaft/tube/I-beam, or any suitable shape which those skilled in the art can arrive at using the present disclosure Solid or hollow shaft Track Trebuchet-like structure to provide force Jai alai-like structure to provide force Lacrosse stick-like structure to provide force Clay pigeon thrower-like structure to provide force Tensioned spring release, i.e., spring load the shaft such that when the projectile is pushed down on the shaft, the spring is compressed and the projectile engagement system docks to the projectile to hold it firmly in place, where the release of the spring tension acts to accelerate and/or assist the projectile launch Whip like-structure to provide force Hinged structure to provide force In an embodiment, the projectile 206 may be held on the launch guide 204 by one of the following:

Friction

Mechanical pressure and/or tension or clamping

Magnetic tension (such as inclusion of magnets at tip of launch guide and a point of contact inside the projectile to provide force)

Hook and loop fastener to provide tension

Figure 2:
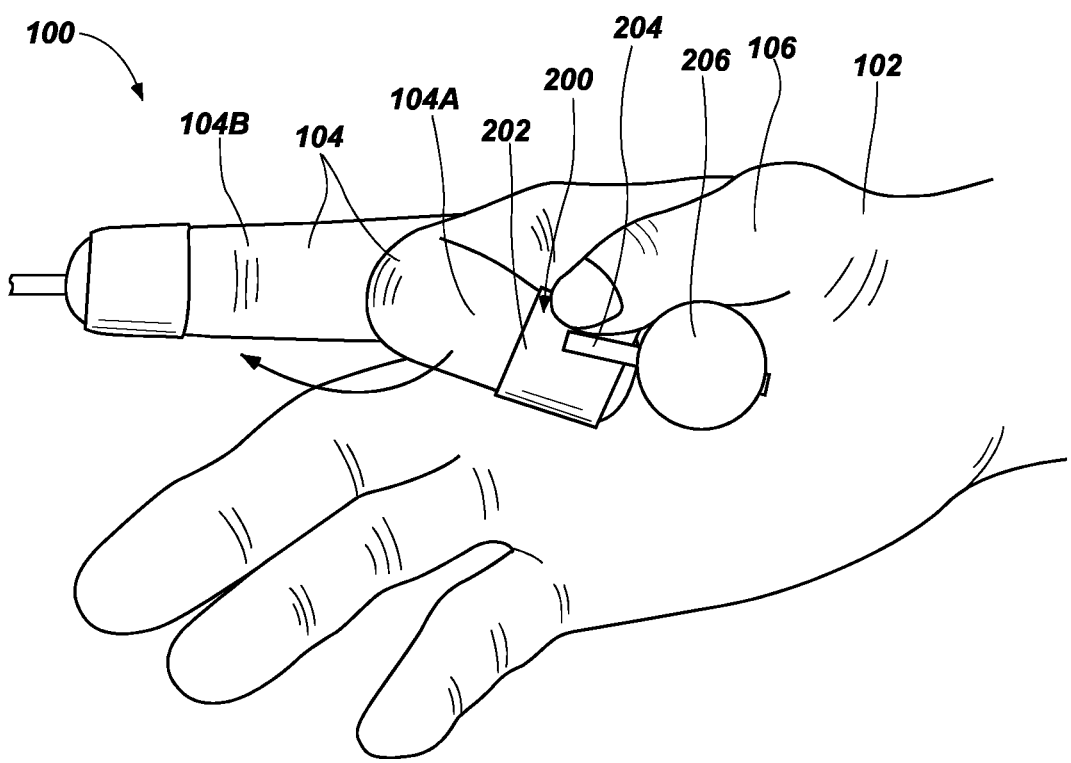
FIG. 2 is an isometric view of the present invention attached to the distal phalanx of an index finger with a single-shaft launch guide embodiment.

Referring now to FIG. 2, where like reference numerals depict like components, there is shown the thumb 106 in a tensioning position on the finger 104.

Figure 3:
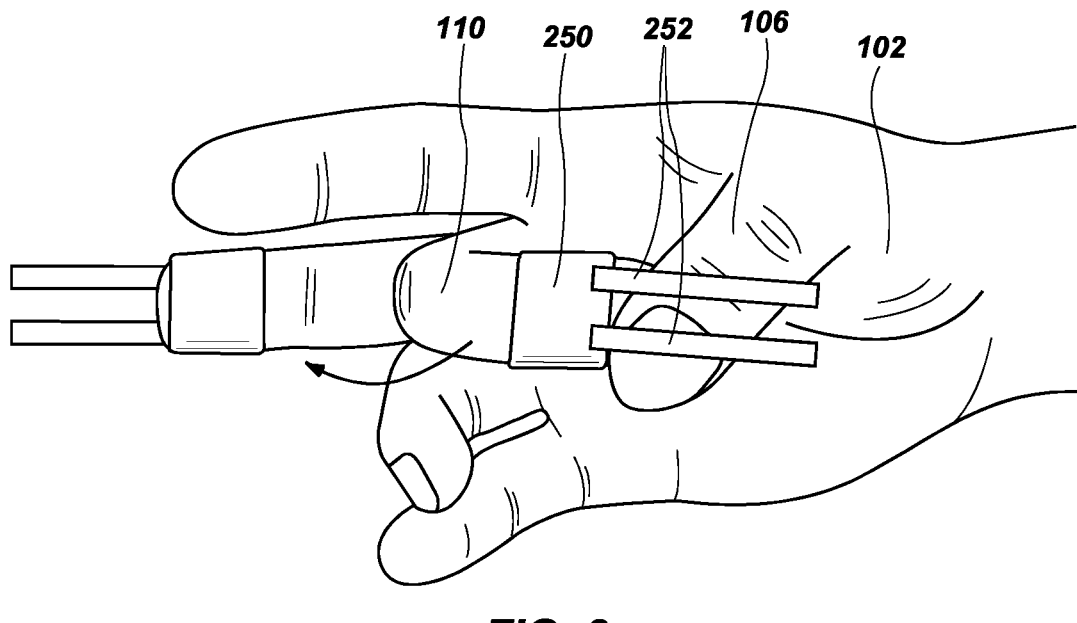
FIG. 3 is an isometric view of the present invention attached to the distal phalanx of a second finger with a dual-shaft launch guide embodiment.

Referring now to FIG. 3, there is shown a launch device 250 attached to the distal phalanx of a second finger 110 with a dual-shaft launch guide embodiment. In an embodiment, the launch guides 252 are positioned on the dorsal side of the finger 110 and tension of the thumb 106 is applied at the distal end of the distal phalanx.

Figure 4:
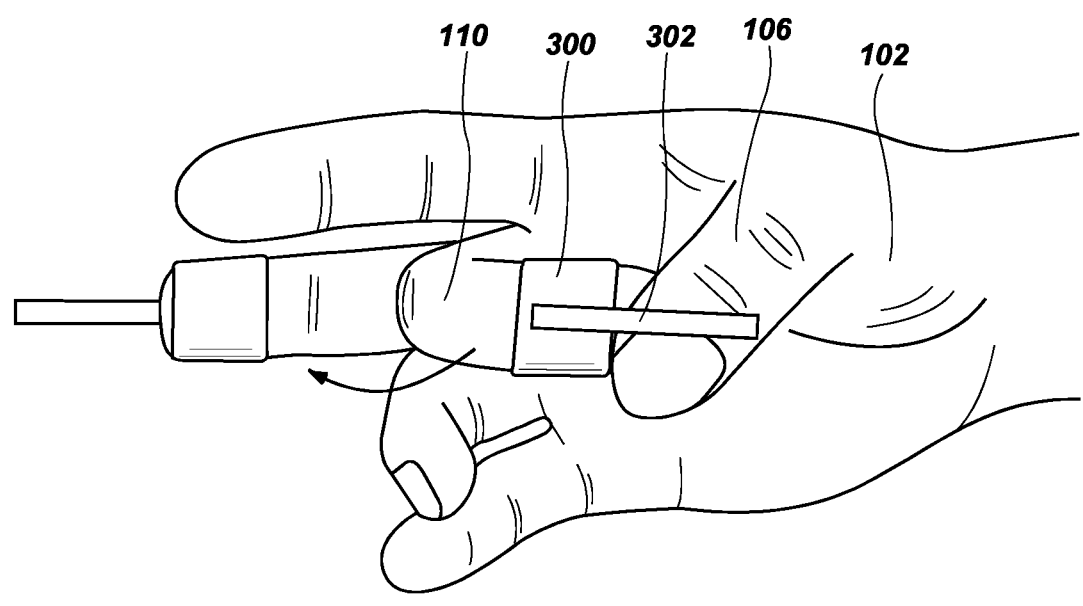
FIG. 4 is an isometric view of the present invention attached to the distal phalanx of a second finger with a single-shaft launch guide embodiment.

Referring now to FIG. 4, there is shown a launch device 300 attached to the distal phalanx of a second finger 110 with a single-shaft launch guide embodiment. In an embodiment, the launch guide 302 is positioned on the dorsal side of the finger 110 and tension of the thumb 106 is applied at the distal end of the distal phalanx.

Figure 5:
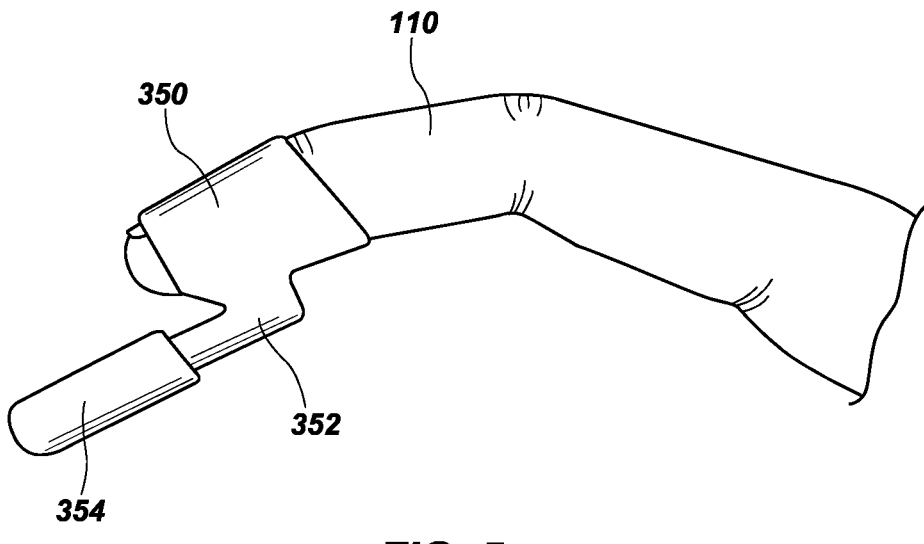
FIG. 5 is an isometric view of the present invention attached to the distal phalanx of a finger with a single-shaft launch guide embodiment.

Referring now to FIG. 5, there is shown a launch device 350 attached to the distal phalanx of a second finger 110 with a single-shaft launch guide embodiment. In an embodiment, the launch guide 352 is positioned on the palmar side of the finger 110. A cylindrical projectile 354 is shown loaded onto the launch guide 352.

Figure 6:
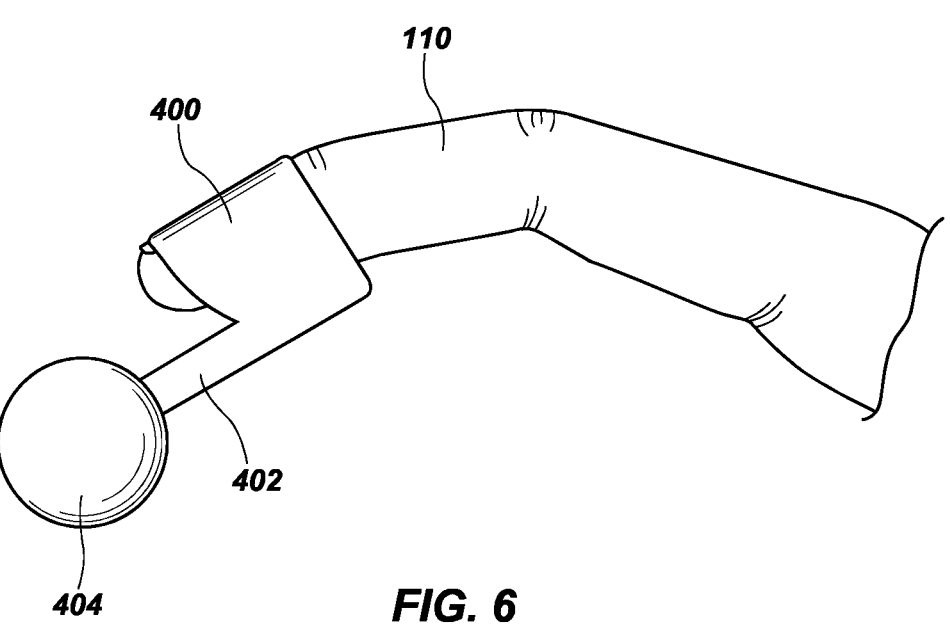
FIG. 6 is an isometric view of the present invention attached to the distal phalanx of a finger with a single-shaft launch guide embodiment.

Referring now to FIG. 6, there is shown a launch device 400 attached to the distal phalanx of a second finger 110 with a single-shaft launch guide embodiment. In an embodiment, the launch guide 402 is positioned on the palmar side of the finger 110. A spherical projectile 404 is shown loaded onto the launch guide 402.

Figure 7:
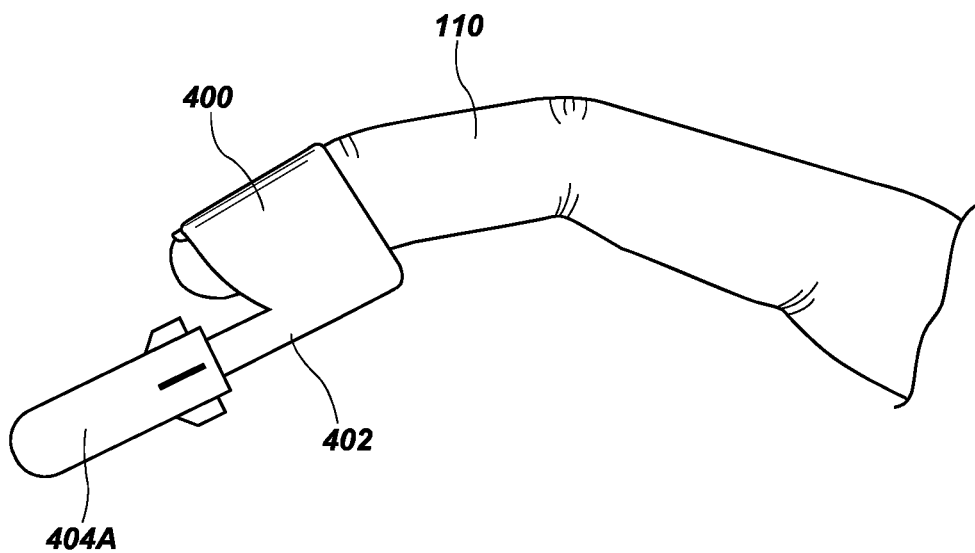
FIG. 7 is an isometric view of the present invention attached to the distal phalanx of a finger with a single-shaft launch guide embodiment.

Referring now to FIG. 7, there is shown a launch device 400 attached to the distal phalanx of a second finger 110 with a single-shaft launch guide embodiment. In an embodiment, the launch guide 402 is positioned on the palmar side of the finger 110. A cylindrical projectile 404A is shown loaded onto the launch guide 402. The projectile 404A may include stabilization fins.

Figure 8:
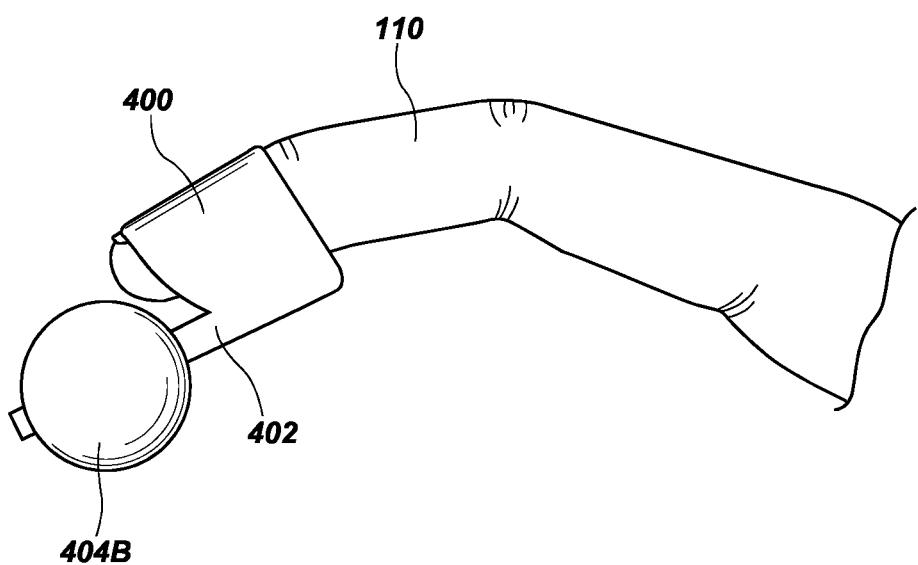
FIG. 8 is an isometric view of the present invention attached to the distal phalanx of a finger with a single-shaft launch guide embodiment.

Referring now to FIG. 8, there is shown a launch device 400 attached to the distal phalanx of a second finger 110 with a single-shaft launch guide embodiment. In an embodiment, the launch guide 402 is positioned on the palmar side of the finger 110. A spherical projectile 404B is shown loaded onto the launch guide 402.

Figure 9:
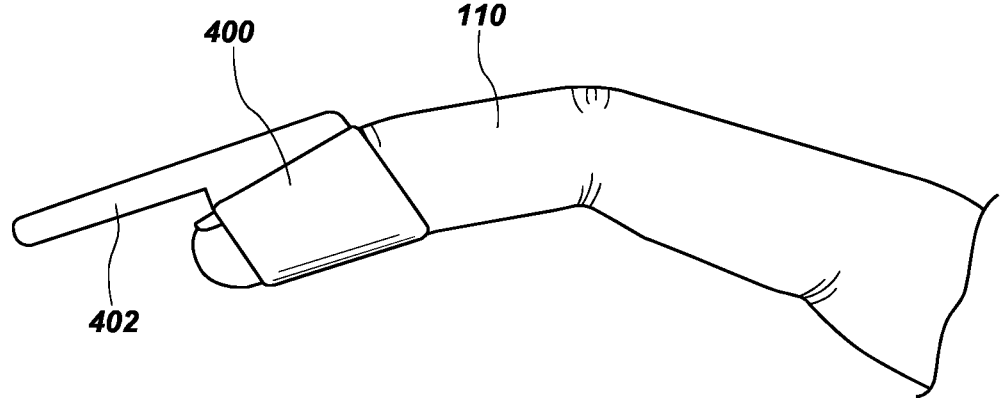
FIG. 9 is an isometric view of the present invention attached to the distal phalanx of a finger with a single-shaft launch guide embodiment.

Referring now to FIG. 9, there is shown a launch device 400 attached to the distal phalanx of a finger 110 with a single-shaft launch guide embodiment. In an embodiment, the launch guide 402 is positioned on the dorsal side of the finger 110.

Figure 10:
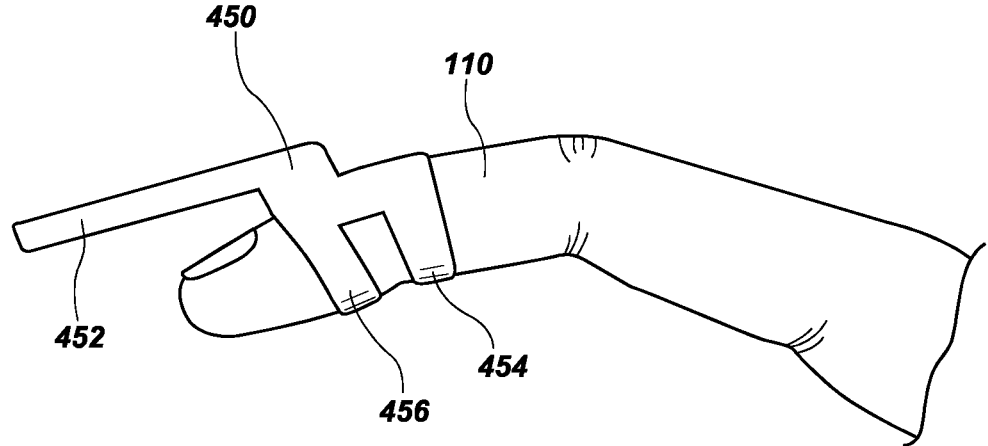
FIG. 10 is an isometric view of the present invention attached to the distal phalanx of a finger with a single-shaft launch guide embodiment.

Referring now to FIG. 10, there is shown a launch device 450 attached to the distal phalanx of a finger 110 with a single-shaft launch guide embodiment. In an embodiment, the launch guide 452 is positioned on the dorsal side of the finger 110. The launch guide 452 is secured to the finger 110 using a dual rings 454 and 456.

Figure 11:
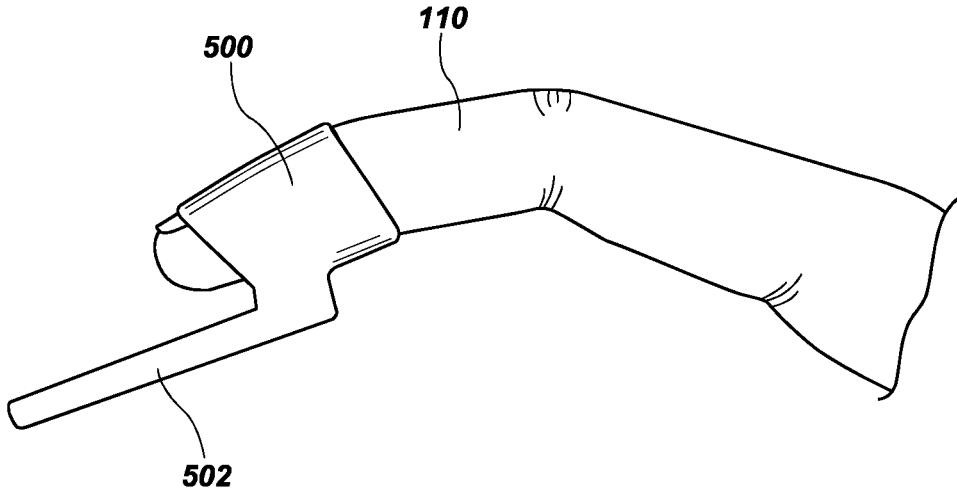
FIG. 11 is an isometric view of the present invention attached to the distal phalanx of a finger with a single-shaft launch guide embodiment.

Referring now to FIG. 11, there is shown a launch device 500 attached to the distal phalanx of a finger 110 with a single-shaft launch guide embodiment. In an embodiment, the launch guide 502 is positioned on the palmar side of the finger 110.

Figure 12:
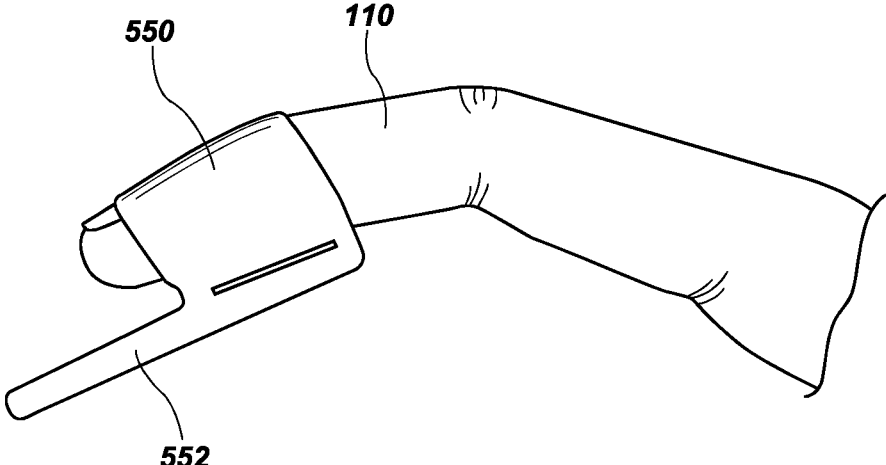
FIG. 12 is an isometric view of the present invention attached to the distal phalanx of a finger with a single-shaft launch guide embodiment.

Referring now to FIG. 12, there is shown a launch device 550 attached to the distal phalanx of a finger 110 with a single-shaft launch guide embodiment. In an embodiment, the launch guide 552 is positioned on the palmar side of the finger 110.

Figure 14:
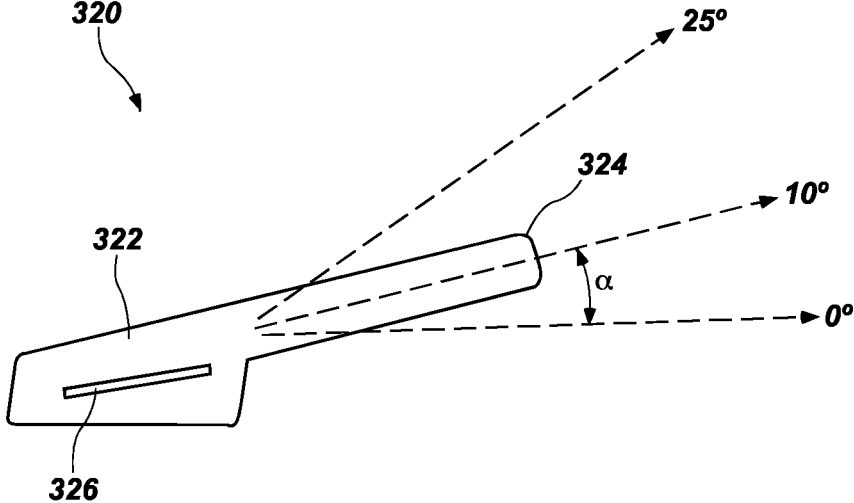
FIG. 14 depicts a projectile launch device according to an embodiment of the present disclosure.

Referring to FIG. 14, there is shown a projectile launch device 320 according to an embodiment of the present disclosure. The launch device 320 may include a base member 322. The base member 322 may include a slot 326 for receiving a securing member (not shown) configured and adapted to mount the base member 322 onto a finger of a user. The securing member may take the form of the securing members described herein, including a strap installed in the slot 326. Extending from the base member 322 is a launch guide 324. The launch guide 324 may form an angle, α, with an axis extending in the same direction as the pointing direction of a finger that is represented by the 0° dashed line. In an embodiment, the angle, α, is between 0° and 25°. In an embodiment, the angle, α, is about 10°. In an embodiment, the angle, α, is any angle.

Figure 16:
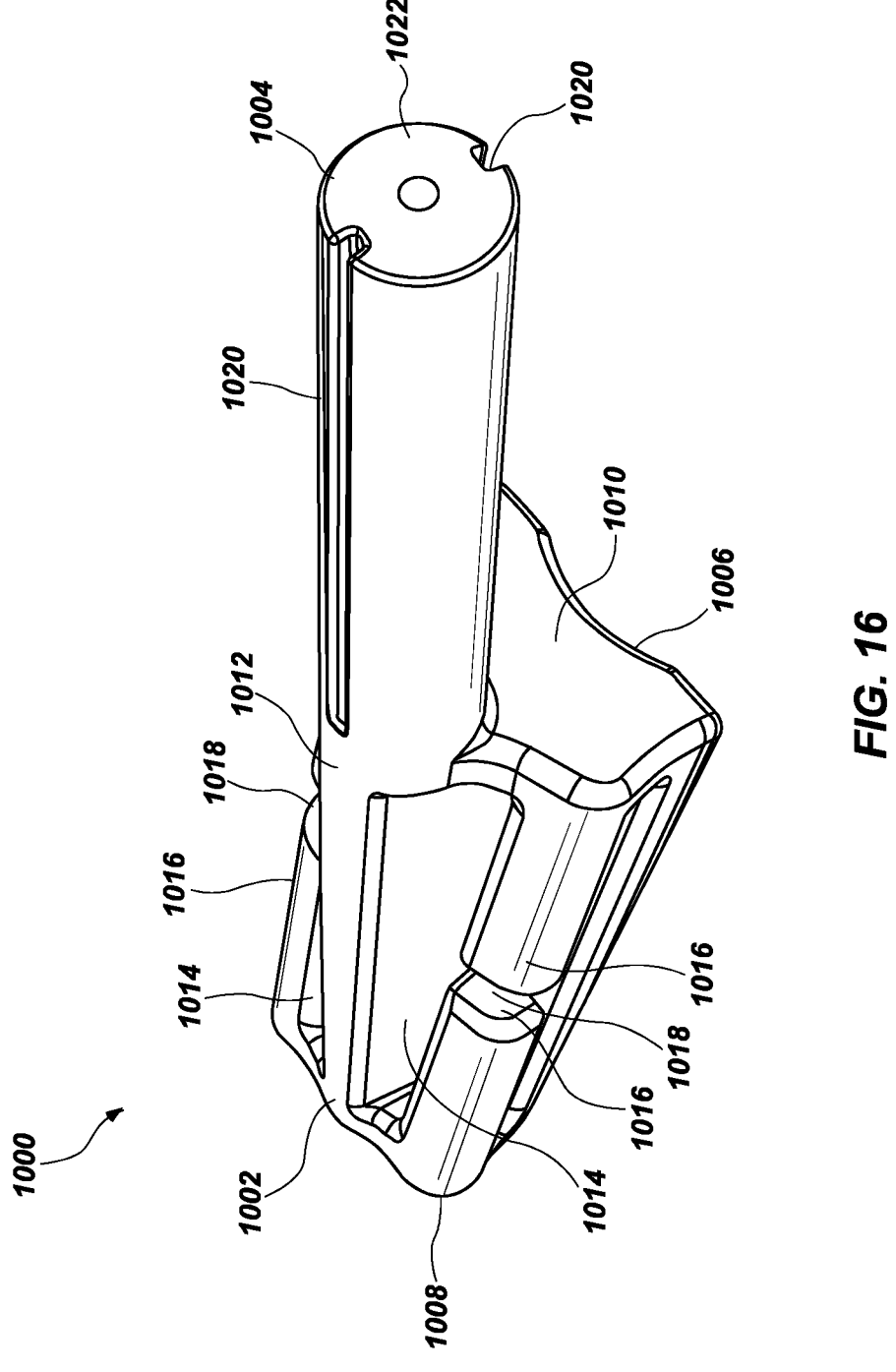
FIG. 16 depicts an isometric view of a projectile launching device according to an embodiment of the present disclosure.
Figure 17:
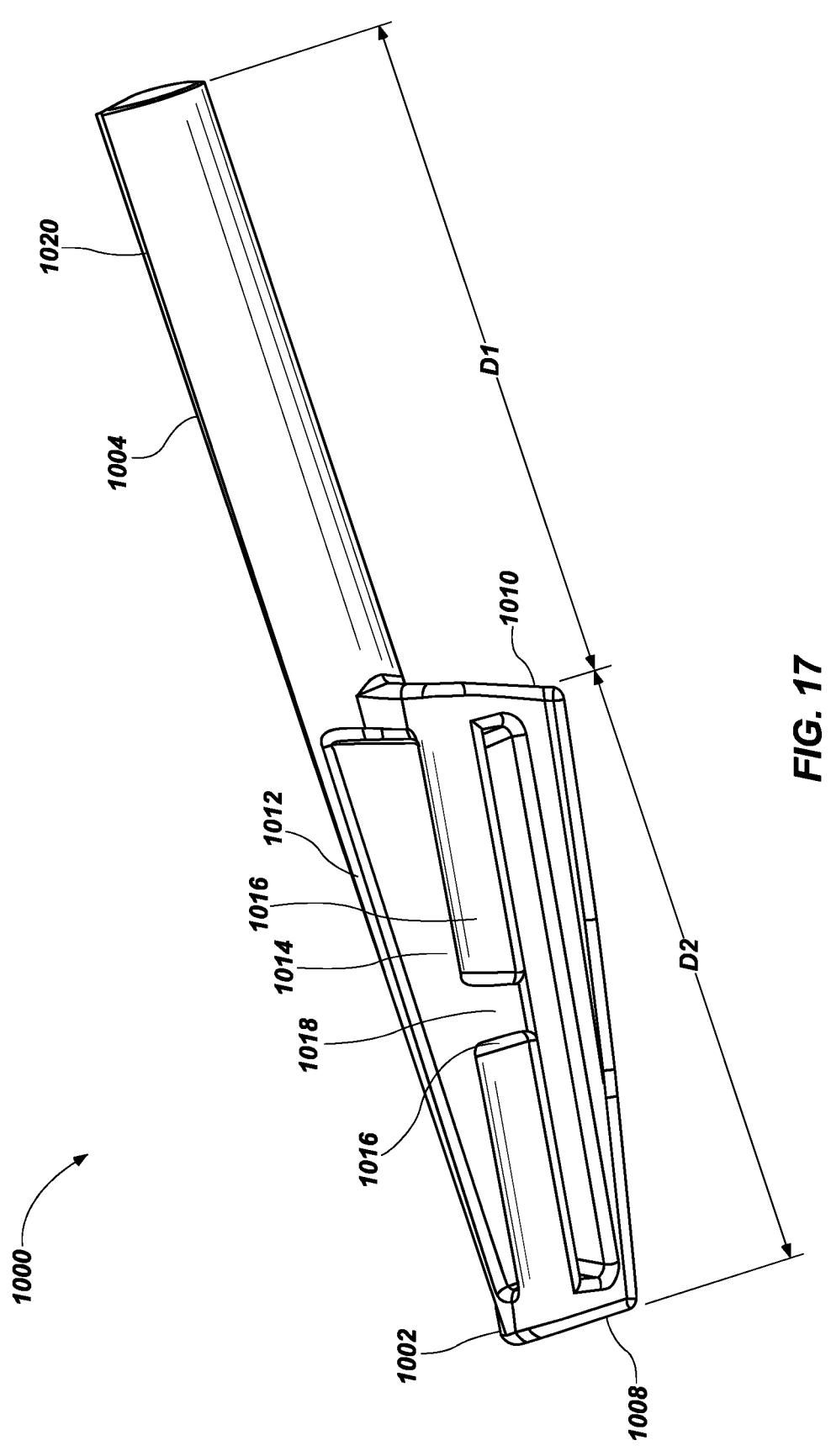
FIG. 17 depicts a side view of a projectile launching device according to an embodiment of the present disclosure.

Referring now to FIGS. 16-19, there is shown a projectile launch device 1000 according to an embodiment of the present disclosure. The device 1000 may include a base member 1002 having an elongated launch guide or track 1004 extending therefrom. In an embodiment, the launch guide 1004 may have a length, D1, between one and three inches as shown in FIG. 17. In an embodiment, the launch guide 1004 may have a length, D1, of about two inches. It will be appreciated that the length, D1, of the launch guide 1004 may be any suitable length in an embodiment of the present disclosure.

In an embodiment, a length, D2, of the base member 1002 is between one and three inches. In an embodiment, the length, D2, of the base member 1002 is between one and one half inches and two and one half inches. It will be appreciated that the length, D2, of the base member 1002 may be any suitable length in an embodiment of the present disclosure.

Figure 19:
FIG. 19 depicts a bottom view of a projectile launching device according to an embodiment of the present disclosure.

As best seen in FIGS. 16 and 19, a bottom surface 1006 of the base member 1002 may be concave. The bottom surface 1006 may extend from a proximal end 1008 to a distal end 1010 of the base member 1002. In particular, the bottom surface 1006 may be concave in order to receive a finger of a user. It will be appreciated that the concave shape of the bottom surface 1006 will allow the base member 1002 to more securely attach to a finger of a user. In an embodiment, the bottom surface 1006 may be any shape, including flat, concave or convex.

Figure 18:
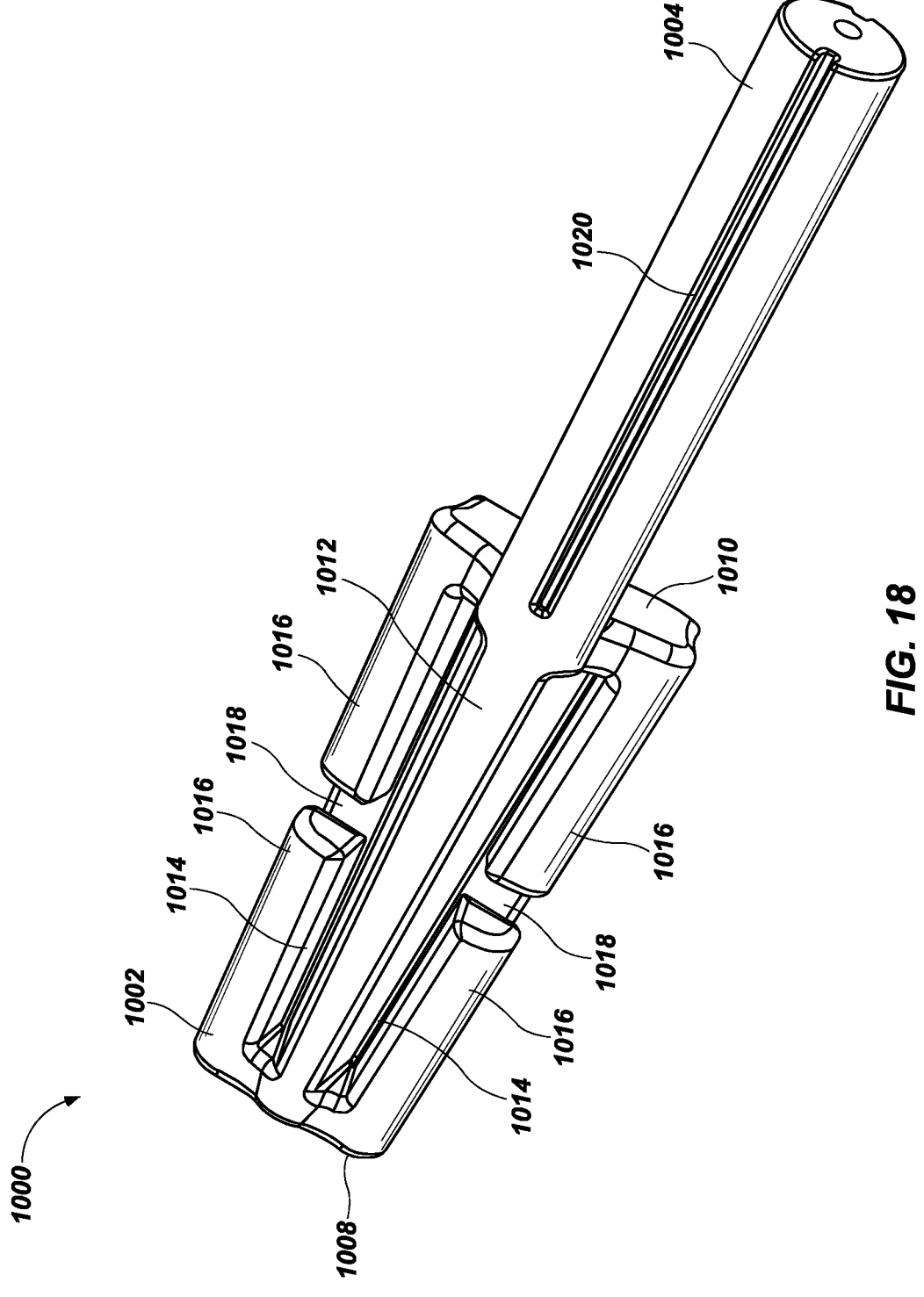
FIG. 18 depicts a top view of a projectile launching device according to an embodiment of the present disclosure.

As best seen in FIGS. 16-18, the base member 1002 may include a central rib 1012. Disposed on either side of the central rib 1012 may be a strap slot 1014. In an embodiment, the strap slots 1014 are configured and adapted for receiving a strap (not shown). In an embodiment, the strap may be fabricated from an elastic, or non-elastic, material. In an embodiment, the strap may include a pair of straps. Opposing members 1016 of the slots 1014 may define a gap 1018 that facilitates strap insertion into the slots 1014.

In an embodiment, formed in the launch guide 1004 may be one or more grooves 1020. In an embodiment, the grooves 1020 may extend along the entire length of the launch guide 1004. In an embodiment, the grooves 1020 are linear. In an embodiment, the grooves 1020 are non-linear. It will be appreciated that the grooves 1020 may serve to reduce or eliminate vacuum pressure when a projectile (not shown) is launched. In addition, it will be appreciated that the grooves 1020 may service to reduce or eliminate friction between the projectile and the launch guide 1004. In an embodiment, the launch guide 1004 may include rifling to impart spin to the projectile during launch in order to add stability to the flight of the projectile. In particular, the rifling may serve to gyroscopically stabilize the projectile, improving its aerodynamic stability and accuracy. In an embodiment, the grooves 1020 may have multiple width, depth and orientations. In an embodiment, the grooves 1020 may be one of straight or helical or some other shape.

Referring to FIG. 16, in an embodiment, a distal end 1022 of the launch guide 1004 is one of convex or concave. In an embodiment, the launch guide 1004 contains one or more grooves 1020 and the distal end 1022 is convex. It will be appreciated that the combination of grooves 1020 and the convex end of the launch guide 1004, together enable airflow up the launch guide 1004 and over the distal end 1022 during projectile launch. The combined effect of the grooves 1020 and a convex shape at the distal end 1022 is to minimize or eliminate vacuum pressure during projectile launch and increase the projectile launch velocity.

In accordance with the present disclosure, the launch velocity may be in the range from about 1 meter per second to about 120 meters per second, from about 2 to about 60 meters per second and from about 4 to about 20 meters per second.

In an embodiment, the launch guide 1004 contains one or more grooves 1020 and the distal end 1022 is concave. The combination of the grooves 1020 and the concave shape of the distal end 1022 together enable airflow up the launch guide 1004 and over the distal end 1022 during projectile launch. Thus, the combined effect of grooves 1020 and a concave distal end 1022 is intended to minimize or eliminate vacuum pressure during projectile launch and increase the projectile launch velocity.

Figure 20:
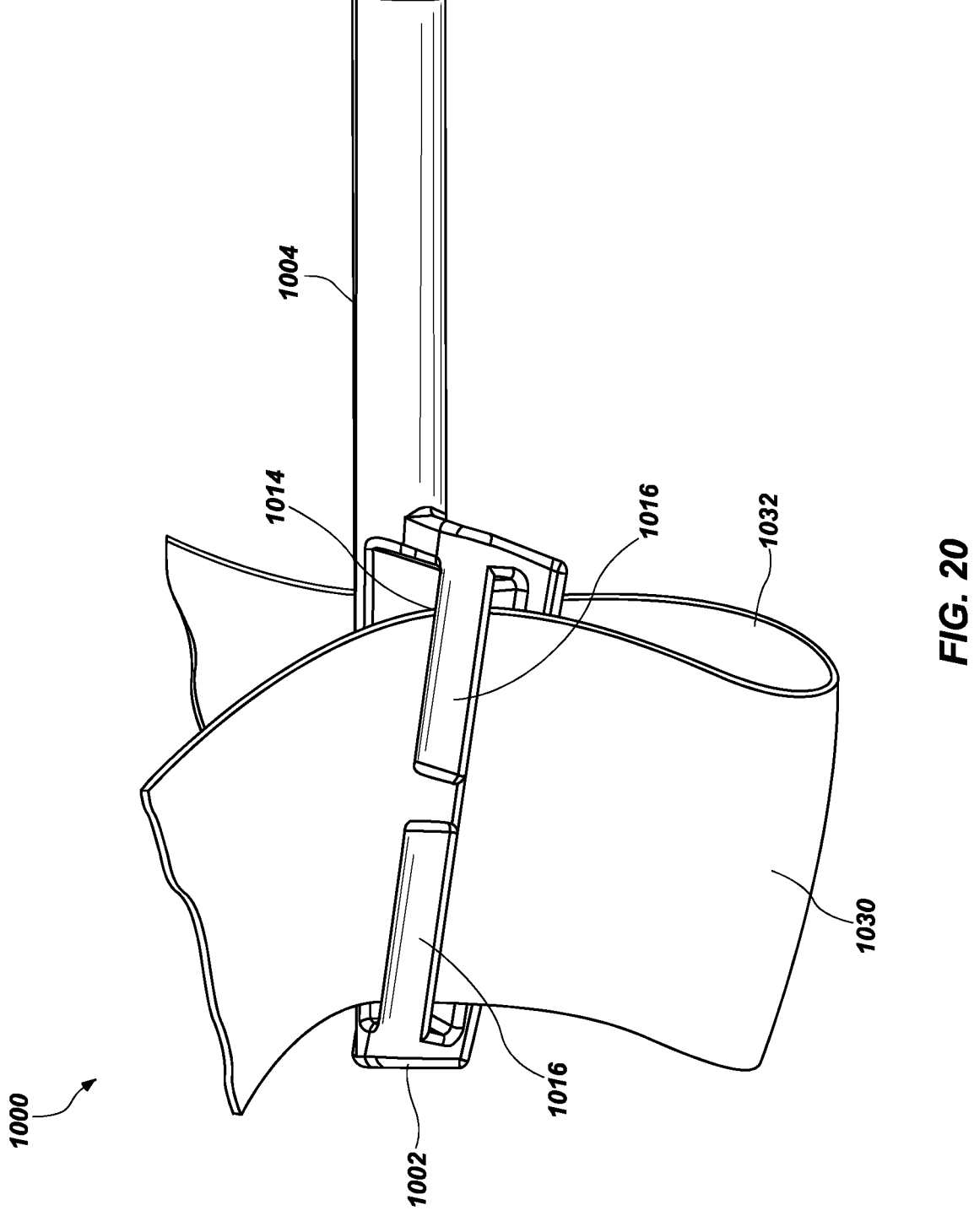
FIG. 20 depicts a side view of a projectile launching device with a strap according to an embodiment of the present disclosure.

Referring to FIG. 20, where like reference numerals depict like components, the device 1000 is shown with a securing member 1030 mounted in the strap slots 1014. The securing member 1030 is maintained in the strap slots 1014 by virtue of a friction fit, such as by pinching or clamping. The securing member 1030 may form a looped portion 1032 configured and dimensioned for receiving a finger of a user in a tight or friction fit. It will be appreciated that the securing member 1030 may take various forms including those described above in relation to securing member 202. It will be appreciated that the securing member 1030 may be flexible or non-flexible.

Figure 21:
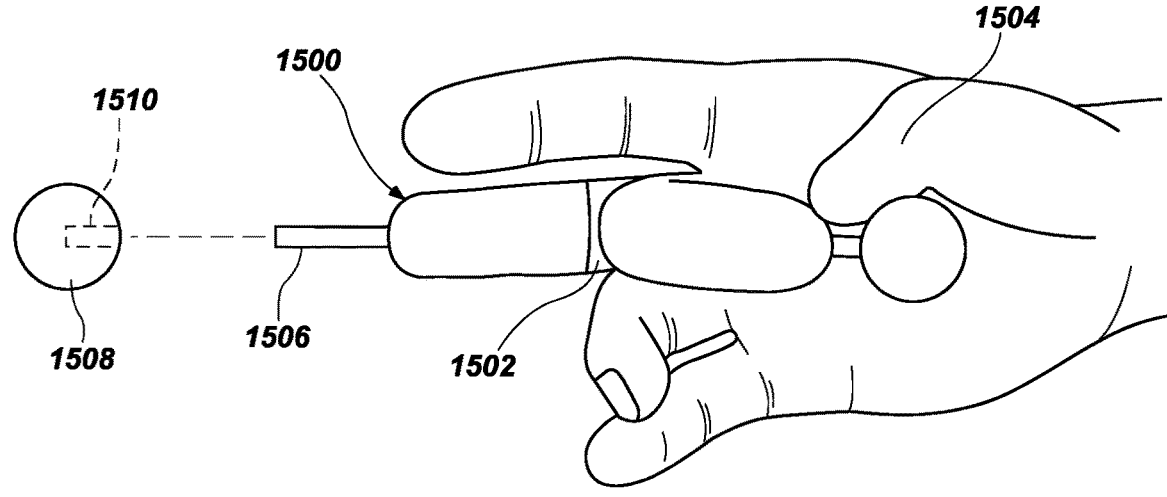
FIG. 21 depicts a projectile launching device installed on a finger of a user according to an embodiment of the present disclosure.

Referring now to FIG. 21, there is depicted a projectile launching device 1500 installed on a middle finger 1502 of a user. The thumb 1504 of the user may be utilized to tension the finger 1502 prior to launch. The device 1500 may include a solid shaft member 1506 extending therefrom. A projectile 1508 may be installed onto the solid shaft member 1506 by sliding a bore 1510 formed in the projectile 1508 over the solid shaft member 1506.

Figure 22:
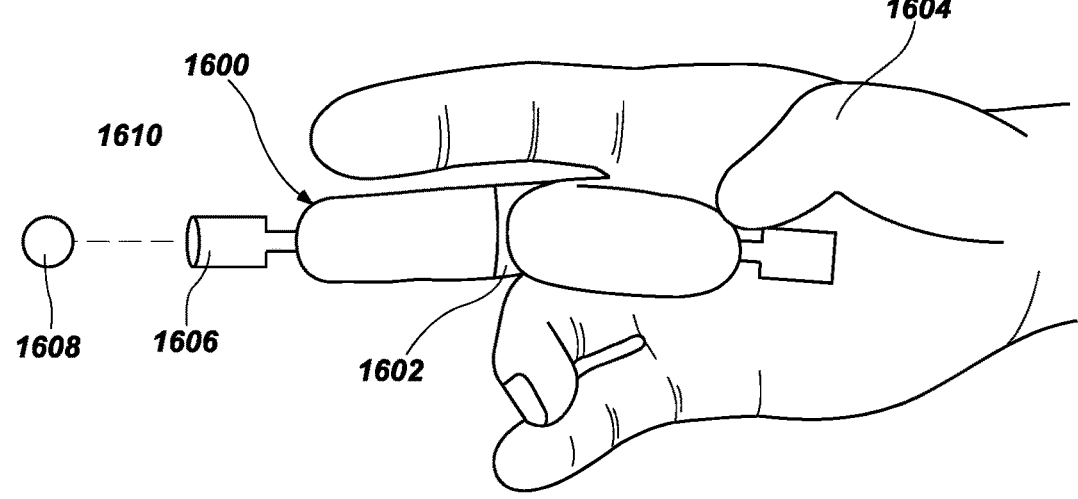
FIG. 22 depicts a projectile launching device installed on a finger of a user according to an embodiment of the present disclosure.
Figure 23:
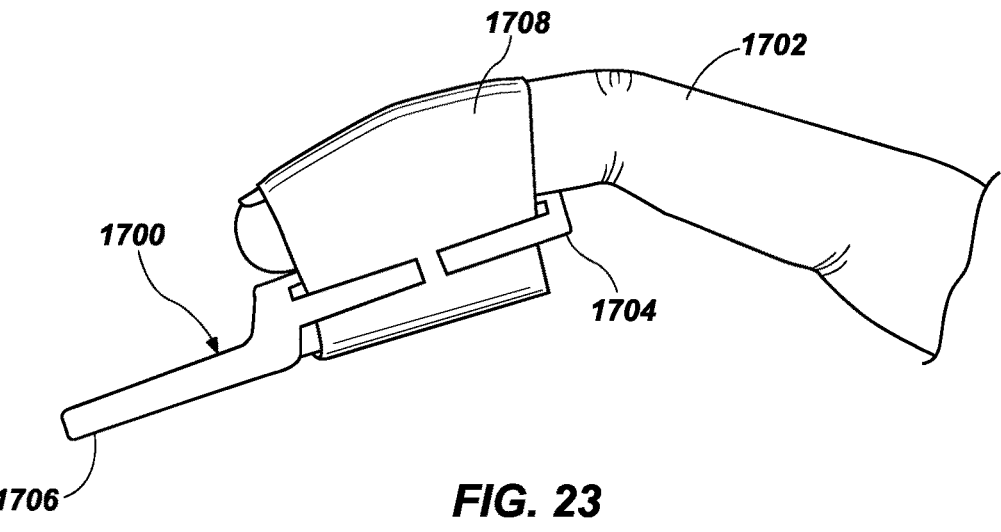
FIG. 23 depicts a projectile launching device installed on a digit of a user according to an embodiment of the present disclosure

Referring now to FIG. 22, there is depicted a projectile launching device 1600 installed on a middle finger 1602 of a user. The thumb 1604 of the user may be utilized to tension the finger 1602 prior to launch. The device 1600 may include a hollow shaft member 1606 extending therefrom. A projectile 1608 may be installed into the hollow shaft member 1606 by inserting the projectile 1608 into an opening 1610 that leads into the interior of the hollow shaft member 1606. Referring now to FIG. 23, there is depicted a projectile launching device 1700 installed on a finger 1702 of a user. The device 1700 may include a base member 1704. The device 1700 may further include a shaft member 1706 extending from the base member 1704. A projectile may be installed onto the shaft member 1706. A securing member 1708 may secure the base member 1704 to the finger 1702. In an embodiment, the securing member 1708 may comprise a strap or another securing member, including the types disclosed herein. As can be observed, the securing member 1708 may extend from the distal phalanx, over the distal inter-phalangeal joint, and to the middle phalanx of the finger 1702. The securing member 1708 may terminate just prior to the proximal inter-phalangeal joint.

In an embodiment, the present invention may include a thumb grip for enhanced launching of the projectile. The thumb grip is a component that will effectively aid in the launching motion by allowing the user to securely hold a finger in the cocked position with the thumb, easily and quickly release a finger from the cocked position to execute the launching action, and more accurately direct the projectile flight path. For example, if the user holds a finger in the cocked position with the thumb, whereas the thumb is positioned on the dorsal side of said finger either on the distal phalanges, intermediate phalanges or some combination thereof, the launching motion, and hence the projectile flight path, will be altered due to the modified arc and/or motion path of the finger from which the projectile is launched as a result of releasing the thumb tension. Using a thumb grip to securely hold a finger in the cocked position enables a uniform arc of the finger engaged in the launching motion when the thumb tension is released. A more uniform arc of the finger engaged in the launching motion should result in more accurate projectile targeting and increased projectile velocity.

Figure 24:
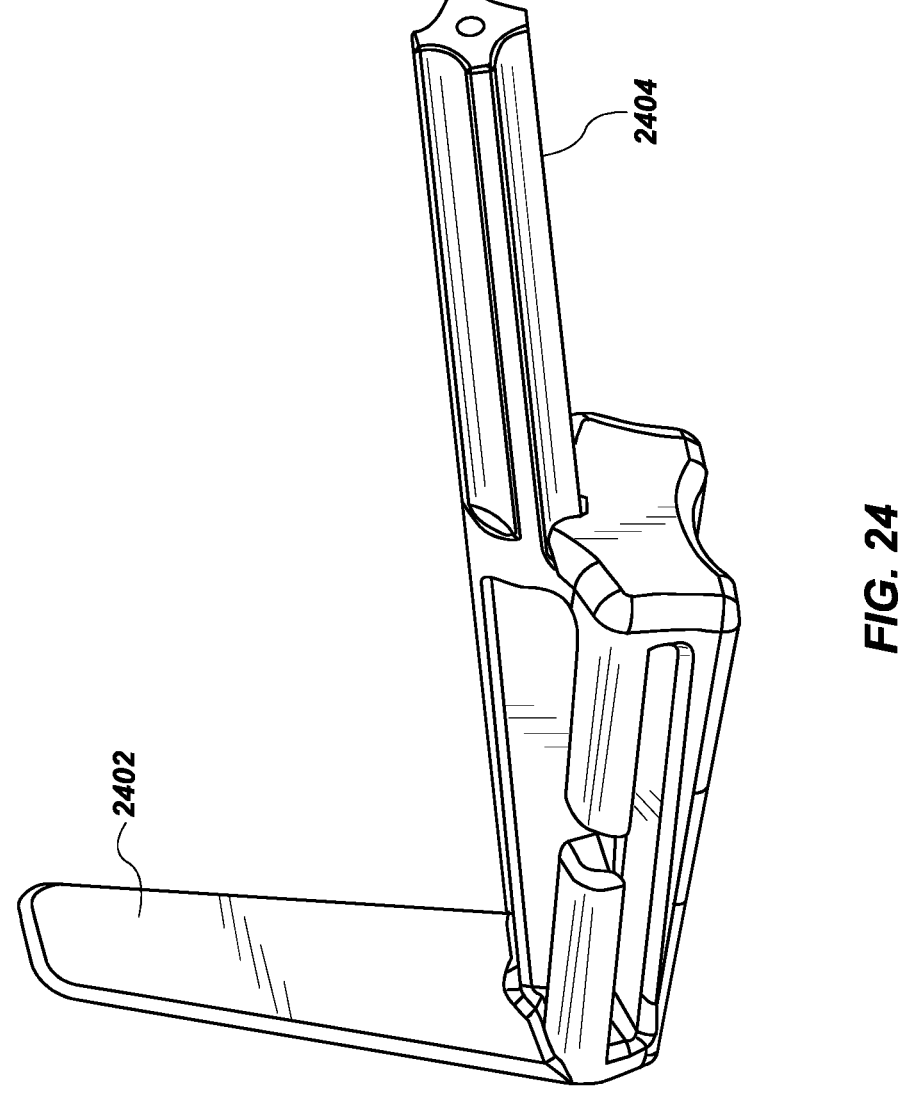
FIG. 24 depicts a spring-assisted projectile launching device according to an embodiment of the present disclosure.

One embodiment of the present disclosure with a thumb grip is shown in FIG. 24. In one embodiment the thumb grip 2402 is a piece of material extending from the launch guide 2404. In one embodiment the thumb grip 2402 may extend from the launch guide 2404 at an approximately ninety (90) degree angle.

Figures 25A, 25B, 25C:
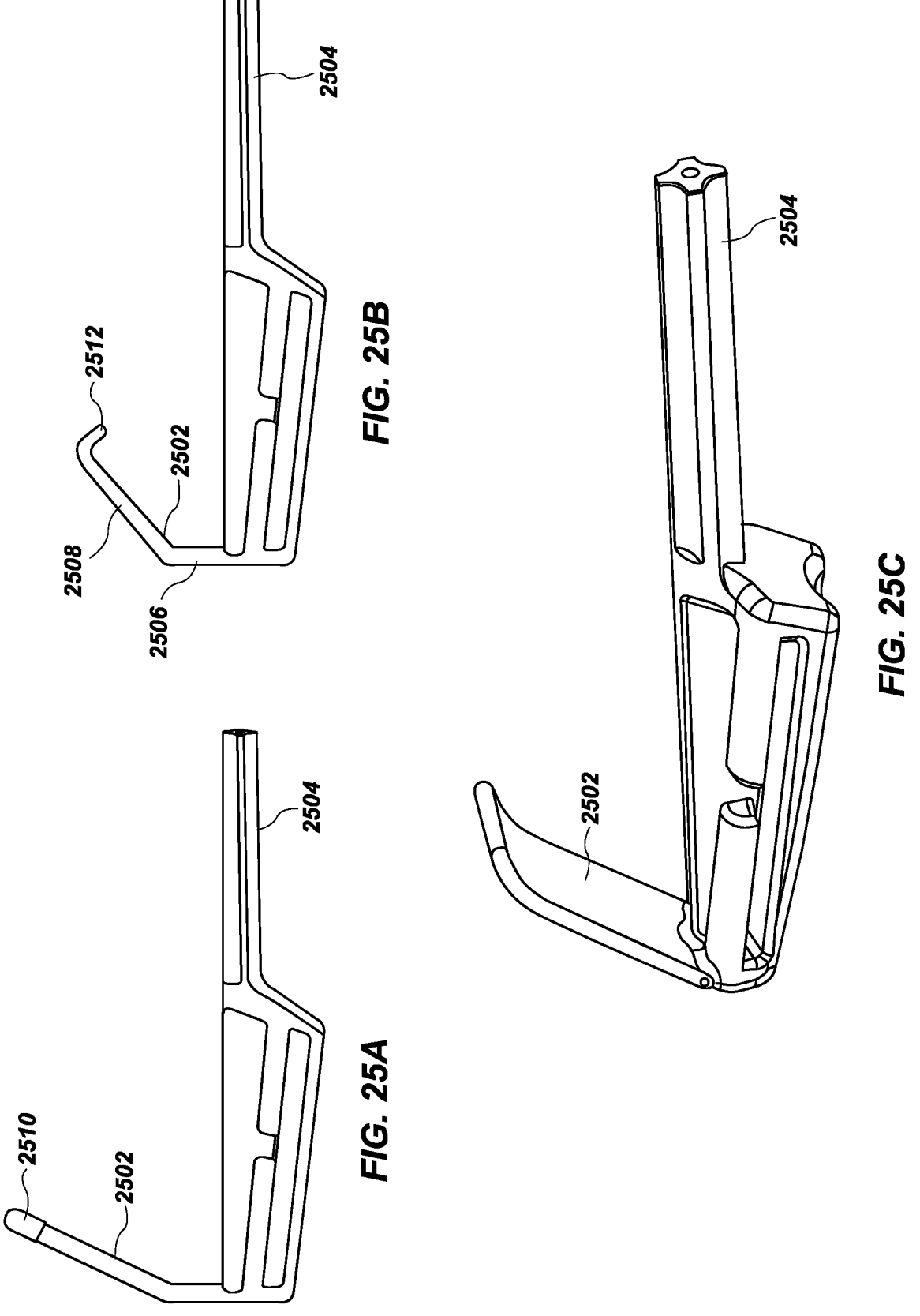
FIGS. 25A-C depict a spring-assisted projectile launching device installed on a digit of a user according to an embodiment of the present disclosure, showing the spring extending below the device.

Another embodiment of a launcher having a digit grip, which in the illustrative embodiment is a thumb grip, is shown in FIG. 25A and FIG. 25B. A thumb grip 2502 extends from the launch guide 2504 a distance 2506 between approximately one-quarter (¼) inches and three-eighths (⅜) inches. The thumb grip then bends at an acute angle to the launch guide 2504. In one embodiment this is an angle of approximately seventy (70) degrees as shown in FIGS. 25A-B and the thumb grip extends another distance 2508 of between approximately one (1) and two (2) inches. The thumb grip may be of an appropriate size to facilitate the launching of a projectile by the appropriate launching motion. In one embodiment the thumb grip 2502 may illustratively be between approximately three-eighths (⅜) inches and five-eighths (⅝) inches wide and between one-quarter (¼) inches and one-eighth (⅛) inches thick. The thumb grip 2502 may include a rubber tip 2510 as shown in FIG. 25A on the end of the thumb grip 2510 to facilitate holding the thumb grip in order to properly launch the projectile. In addition, the tip 2512 of the thumb grip may be bent over to eliminate any sharp edges and have the thumb grip fit properly in a user's hand, as shown in FIG. 25B.

In another illustrative embodiment, shown in FIG. 25C, a thumb grip 2502 may extend at an angle less than ninety (90) degrees from the launch guide 2504, which bends over at the tip 2512. Said thumb grip may extend approximately two (2) inches from the launch guide and be approximately five-eighths (⅝) inches wide. In another illustrative embodiment, the length of the thumb guide may be adjusted to be an appropriate size to fit the hand of the user. This length may be from approximately one (1) inch to approximately two-and-a-half (2.5) inches.

In other illustrative embodiments, the thumb grip may incorporate a spring tension/release mechanism. This mechanism will effectively aid in the launching motion by allowing the user to securely hold a finger in the cocked position with the thumb, easily and quickly release a finger from the cocked position to execute the launching motion, more accurately direct the projectile flight path, and increase projectile release velocity with the spring tension/release mechanism. For example, in an embodiment, when the launcher is seated on the dorsal side of a distal and/or intermediate phalanges, the thumb grip is positioned at the distal end of the finger (and may extend beyond the distal end of said finger) to provide a platform by which the thumb can supply tension to the cocked finger/fingers engaged in the launching motion. When the thumb is positioned on the thumb grip, the hinged and spring tensioned launch guide is cocked in the palmer direction such that when the thumb is released, the spring tension is released causing the launch guide to quickly snap in the dorsal direction at the same time the finger is snapped in the distal directional plane as a result of the flicking/flinging motion. The combination of the launching motion and the thumb grip spring tension release mechanism will cause a net increase in projectile release velocity as compared to the launching motion alone.

Figures 26A, 26B, 26C:
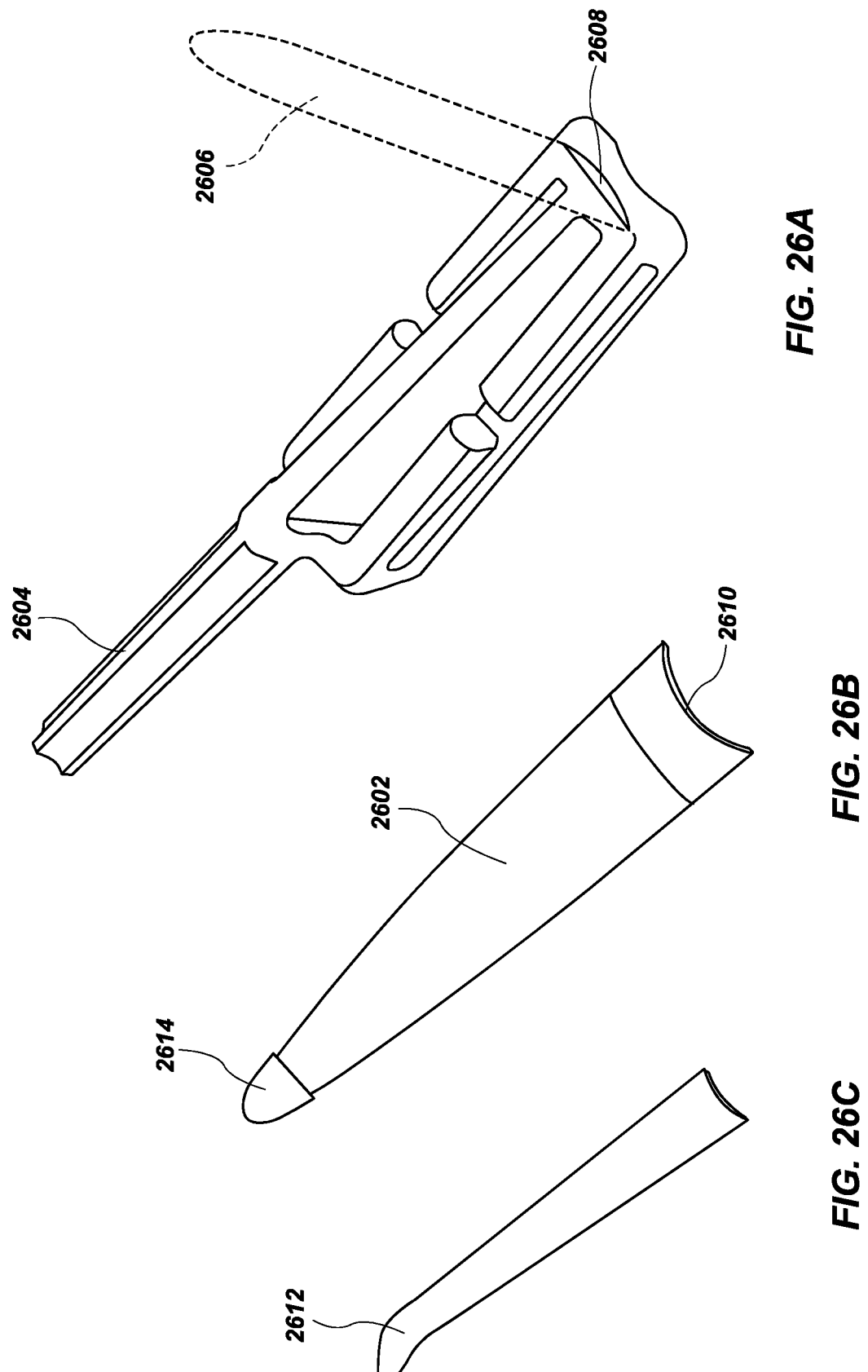
FIGS. 26A-C depict a spring-assisted projectile launching device beginning to be drawn back in the hand showing the spring beginning to bend as a finger of the user is bent, putting tension on the spring.

An additional illustrative embodiment shown in FIG. 26 may incorporate a spring tension/release mechanism into the launcher without the addition of a thumb grip. In one embodiment, a spring 2602 is attached to the launcher in position 2606 (as shown by the dotted line) perpendicular to the launch guide 2604. In one embodiment the spring may be attached to the launcher at up to 15 degrees off of the perpendicular in either direction. The spring 2602 may be constructed of any material which provides flexibility and spring power. In one embodiment the spring may be constructed of low density polyethylene. In one embodiment the spring 2602 snaps into a slot 2608 at the base of the launcher. The spring 2602 may be easily removable and interchangeable. This may facilitate use by persons with different-sized hands or springs with different flexibilities. In one embodiment the spring may be an elongated shape with a tip as shown in FIG. 26B.

In another illustrative embodiment the spring may have a tip 2612 which is slightly bent as shown in FIG. 26C. In another embodiment the spring may have a rubber tip 2612 added to the tip as shown in FIG. 26B. In an embodiment the spring may have a convex shape 2610 as shown in FIG. 26B. In this embodiment the slot 2608 in the launcher is also formed in a convex shape to receive the spring.

Figure 27:
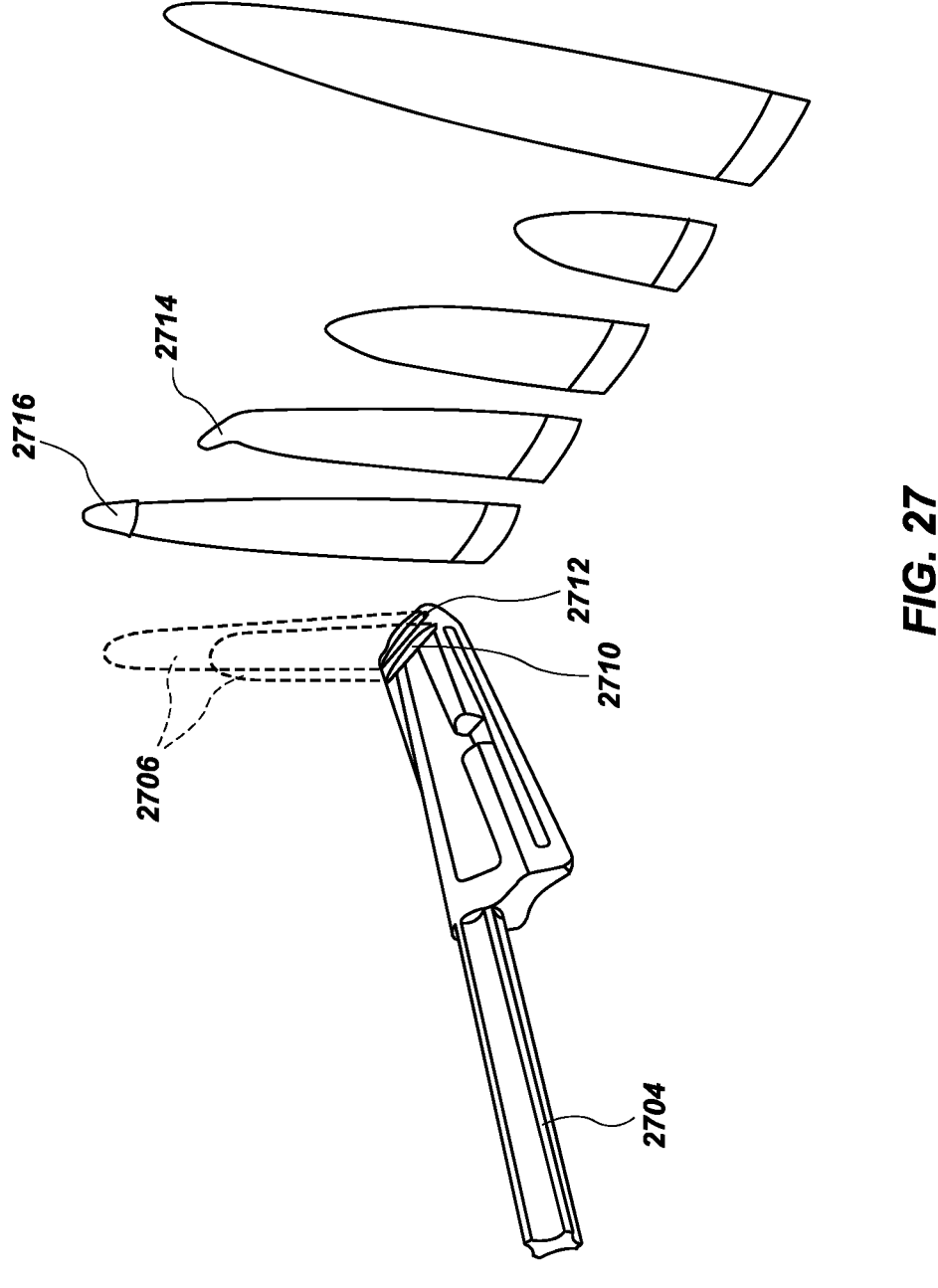
FIG. 27 depicts a spring-assisted projectile launching device according to one embodiment of the present disclosure in the fully set position with the user holding the tense spring in place in preparation to launch the projectile.

In another illustrative embodiment, shown in FIG. 27, the launcher may have a first slot 2710 and a second slot 2712 to attach the spring 2702 perpendicular to the launch guide 2704. In this embodiment, multiple springs can be added to the device, as shown by the dotted lines 2706, thereby increasing the power added to the launch of the projectile by the springs. In one illustrative embodiment the springs are between one (1) inch and four (4) inches long and ¼64 inch and ⅛ inch thick, but can have a variety of sizes as shown in FIG. 27. These springs can have a bent tip 2714 or a rubber tip 2716 can be added to the spring to accommodate the better grip and comfort of the user.

Figures 28A, 28B, 28C:
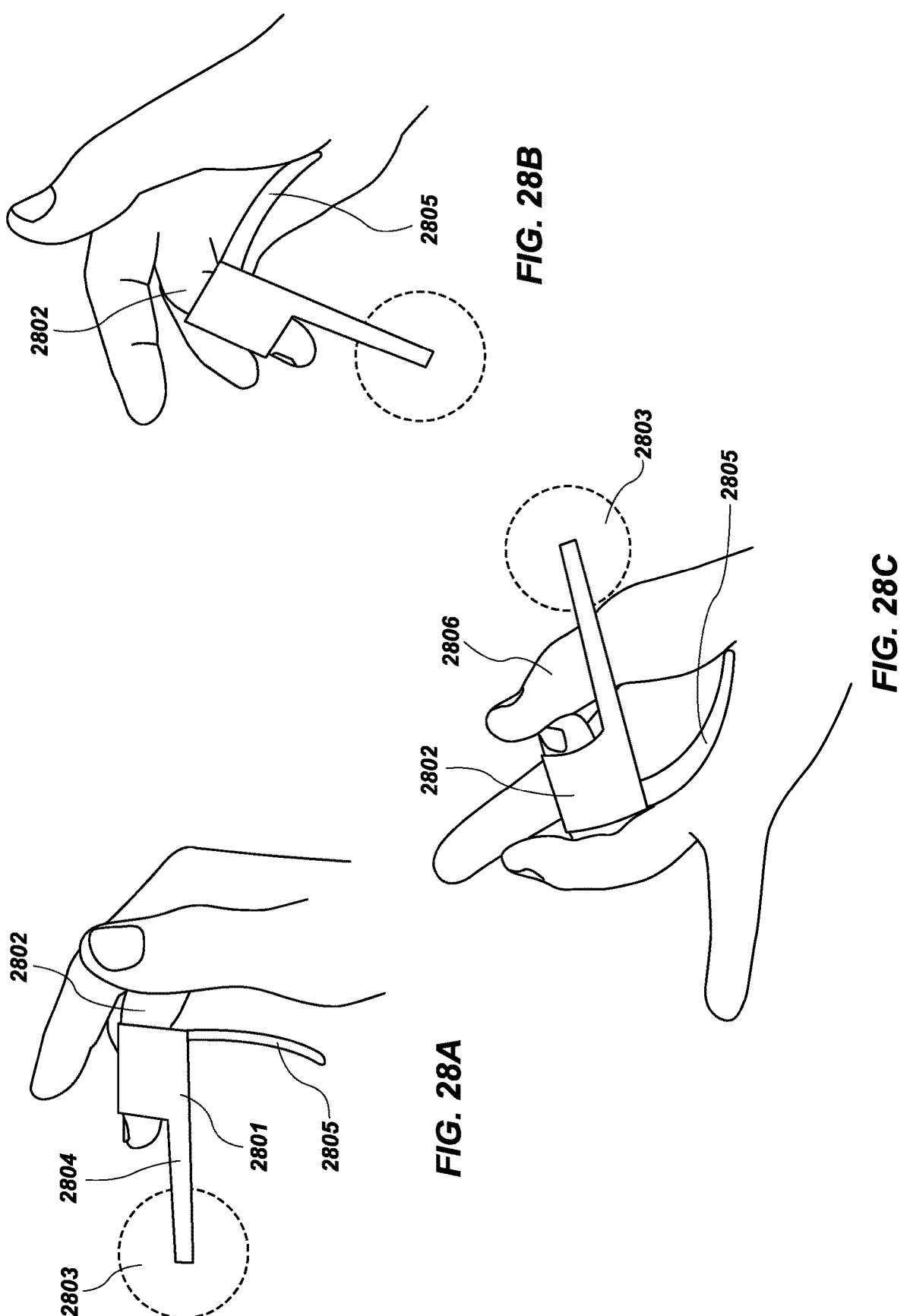
FIGS. 28A-C depict a method of using one embodiment of a spring-assisted digit mounted device for launching projectiles to launch a projectile, showing the device attached to a digit of the hand and the various positions of the fingers and hand used to launch a projectile.

FIGS. 28A-C represent an illustrative embodiment of a process of launching a projectile using a spring-assisted digit mounted device for launching projectiles. In FIG. 28A, the launcher 2801 is shown attached to the finger 2802 of a user showing the loaded projectile 2803 attached to launch guide 2804 and the spring 2805 perpendicular to the launch guide 2804. FIG. 28B illustrates the user beginning to bend back their finger 2802, bending back the spring 2804 and putting tension on the spring 2805. FIG. 28C illustrates the projectile 2803 ready to be launched. The spring 2805 is fully set, while the finger 2802 is fully bent and the user has placed the thumb 2806 on top of the bent finger while holding the spring 2805, which is now under tension, in place. The user then releases the finger from the thumb and proceeds to launch the projectile, with the additional force from the tension of the spring or springs.

An alternate embodiment includes structures for producing a loud sound when the spring tensioned thumb grip is released to launch the projectile.

It will be appreciated that the suitable structure and apparatus disclosed herein is merely one example of a means for launching a projectile, and it should be appreciated that any structure, apparatus or system for launching a projectile which performs functions the same as, or equivalent to, those disclosed herein are intended to fall within the scope of a means for launching a projectile, including those structures, apparatus or systems for launching a projectile which are presently known, or which may become available in the future. Also, structures, apparatus or systems which functions the same as, or equivalently to, a means for launching a projectile fall within the scope of this element.

It will be appreciated that the suitable structure and apparatus disclosed herein is merely one example of a means for mounting a launch guide to a finger, and it should be appreciated that any structure, apparatus or system for mounting the required structures which performs functions the same as, or equivalent to, those disclosed herein are intended to fall within the scope of a means for mounting, including those structures, apparatus or systems for mounting structures to a digit which are presently known, or which may become available in the future. Also, structure, apparatus or systems which functions the same as, or equivalently to, a means for mounting falls within the scope of this element.

In the foregoing Detailed Description, various features of the present disclosure are grouped together in one or more single embodiments for the purpose of streamlining the disclosure. This method of disclosure is not to be interpreted as reflecting an intention that the claimed disclosure requires more features than are expressly recited in each of the following claims. Rather, as the following claims reflect, inventive aspects lie in less than all features of a single foregoing disclosed embodiments. Thus, the following claims are hereby incorporated into this Detailed Description by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An apparatus for launching a projectile, said apparatus comprising:
   a base member;
   a securing member configured and dimensioned to secure the base member to a digit of a user; and
   an elongated launch guide extending from the base member, the elongated launch guide having a length between one and three inches;
   wherein the base member comprises one or more slots configured and dimensioned for receiving the securing member;
   wherein the elongated launch guide comprises a plurality of external grooves formed in an outer surface of the launch guide and extending along the entire length of the launch guide, the external grooves comprising straight rifling or helical rifling;
   wherein the elongated launch guide includes a distal end that is one of concave shaped and convex shaped, and in combination with said distal shape, enable airflow up the launch guide and over the distal end during launch;
   wherein the elongated launch guide is configured and dimensioned to receive the projectile; and
   wherein the projectile comprises a bore and the elongated launch guide comprises a solid shaft member configured to be slidingly received within the bore, such that the projectile is released from the launch guide in response to a launching motion of the digit of the user.

2. The apparatus of claim 1, wherein the elongated launch guide is one of a solid shaft and a hollow shaft.

3. The apparatus of claim 1, wherein the one or more external grooves are external longitudinal grooves extending along the entire length of the launch guide.

4. The apparatus of claim 1, wherein the elongated launch guide comprises a distal end located furthest from the base member, wherein the distal end is one of concave shaped and convex shaped.

5. The apparatus of claim 3, wherein the one or more external longitudinal grooves are linear or non-linear.

6. The apparatus of claim 1, further comprising a spring coupled between the base member and the elongated launch guide, the spring configured to store energy during a pre-launch configuration and to release the stored energy during a launch motion of the digit of the user.

7. The apparatus of claim 1, wherein the securing member comprises one of a finger sleeve, a clip, a ring, a finger cot, a sock, and a strap.

8. The apparatus of claim 1, wherein the securing member defines a loop configured and dimensioned for receiving the digit of the user, wherein the digit is a finger of the user.

9. The apparatus of claim 1, wherein the base member comprises a bottom surface, wherein the bottom surface is concave.

10. The apparatus of claim 1, wherein the elongated launch guide defines an angle with an axis of the digit, wherein the angle is about 10°.

11. The apparatus of claim 1, wherein the projectile comprises a bore, wherein the elongated launch guide is configured and dimensioned to be installed into said bore.

12. A launch system, said launch system comprising:
   a finger-mounted launch device comprising:
      a base member,
      a securing member configured and dimensioned to secure the base member to a finger of a user, and
      an elongated launch guide extending from the base member, the elongated launch guide having a length between one and three inches;
      wherein the base member comprises one or more slots configured and dimensioned for receiving the securing member;
      wherein the elongated launch guide comprises:
         a plurality of external grooves formed in an outer surface of the launch guide and extending along the entire length of the launch guide, the external grooves comprising straight rifling or helical rifling;
         a distal end that is one of concave shaped and convex shaped and wherein the external grooves terminate and open into said distal end; and
         the elongated launch guide is configured and dimensioned to receive the projectile in a pre-launch configuration;
      and a projectile;
   wherein the projectile comprises a bore and the elongated launch guide comprises a solid shaft member configured to be slidingly received within the bore to guide the projectile during pre-launch and to launch the projectile in response to a launching motion of the finger of the user.

13. The system of claim 12, wherein the projectile is one of spherical and cylindrical.

14. The system of claim 12, wherein the projectile comprises one of fins and wings.

15. The system of claim 12, wherein the projectile is one structure selected from a dart and a disk.

16. The system of claim 12, wherein the elongated launch guide is one of a solid shaft and a hollow shaft.

17. The system of claim 12, further comprising one or more grooves formed in the elongated launch guide.

18. The system of claim 12, wherein the elongated launch guide comprises a distal end located furthest from the base member, wherein the distal end is one of concave shaped and convex shaped.

19. The system of claim 17, wherein the one or more grooves are one selected from a linear grove and non-linear groove.

20. The system of claim 12, wherein the securing member defines a loop configured and dimensioned for receiving the finger of the user.

21. The system of claim 12, wherein the base member comprises a concave bottom surface.

22. The system of claim 12, wherein the elongated launch guide defines an angle with an axis of a finger, wherein the angle is about 10°.

23. A method of launching a projectile, said method comprising:
   securing a launch device to a finger of a user, the launch device comprising a base member, a launch guide extending from the base member, and a spring coupled to the launch guide;
   loading a projectile into the launch guide in a pre-launch configuration, the launch guide comprising a plurality of grooves configured to reduce vacuum forces during launch; and launching the projectile from the launch guide into flight by releasing energy stored in the spring in response to the user flicking the finger.

24. The method of claim 23, wherein the launch device comprises an elongated launch guide; wherein the projectile comprises a bore configured and dimensioned to receive the elongated launch guide.

25. The method of claim 24, wherein the elongated launch guide comprises a shaft.

26. The method of claim 23, wherein securing the launch device to the finger of the user comprises securing the launch device to the finger of the user using a securing member.

27. The method of claim 26, wherein the securing member is one selected from the group consisting of a strap, loop and cinch.

28. The method of claim 23, wherein the launch device comprises a concave bottom surface.

29. The method of claim 24, wherein the elongated launch guide defines an angle with an axis of the finger, wherein the angle is about 10°.

30. The method of claim 23, wherein the projectile is one or more of spherical, cylindrical, finned, and winged.

31. A launch system, said launch system comprising:
a lightweight projectile;
a base member and a securing member configured and dimensioned to secure the base member to a digit of a user, wherein the base member comprises one or more slots configured and dimensioned for receiving the securing member, and wherein the securing member defines a loop configured and dimensioned for receiving the digit of the user and mounting the base member to the digit; and
an elongated launch guide extending from the base member, wherein the elongated launch guide is configured and dimensioned to receive the projectile in a pre-launch configuration and has a length between one and three inches; wherein the elongated launch guide comprises a plurality of external grooves formed in an outer surface of the launch guide and extending along the entire length of the launch guide, the external grooves comprising straight rifling or helical rifling; wherein the elongated launch guide comprises a distal end that is one of concave shaped and convex shaped, and wherein the external grooves terminate at and open onto said distal end to form longitudinal air channels; and wherein the projectile comprises a bore and the elongated launch guide comprises a solid shaft member configured to be slidingly received within the bore to launch the projectile into flight in response to a rapid motion of the digit of the user.

32. The launch system of claim 31, wherein the projectile is one of spherical and cylindrical.

33. The launch system of claim 31, wherein the projectile is comprises a projectile selected from the groups comprising projectiles with fins and projectiles with wings.

34. The launch system of claim 31, wherein the projectile is one selected from the groups consisting of a dart and a disk.

35. The launch system of claim 31, wherein the mounting assembly comprises a base member and a securing member configured and dimensioned to secure the base member to a digit of a user.

36. The launch system of claim 31, wherein the launching assembly comprises an elongated launch guide extending from the base member, the launch guide being configured and dimensioned to receive the projectile in a pre-launch configuration and to launch the projectile in response to a rapid motion of the digit of the user.

37. The launch system of claim 36, wherein the elongated launch guide comprises a plurality of grooves formed along its length, the grooves being configured to reduce vacuum forces between the projectile and the launch guide during launch.

38. The launch system of claim 37, wherein the shaft comprises a distal end, wherein the distal end is one of concave shaped and convex shaped.

39. The launch system of claim 31, wherein the projectile comprises a bore.

40. The launch system of claim 31, wherein the mounting assembly comprises a base member having a concave surface configured to conform to the digit of the user.

* * * * *